(12) United States Patent
Nagumo

(10) Patent No.: US 8,614,728 B2
(45) Date of Patent: Dec. 24, 2013

(54) DRIVER DEVICE, PRINT HEAD, AND IMAGE FORMATION APPARATUS

(75) Inventor: Akira Nagumo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 13/433,485

(22) Filed: Mar. 29, 2012

(65) Prior Publication Data

US 2012/0249716 A1 Oct. 4, 2012

(30) Foreign Application Priority Data

Mar. 30, 2011 (JP) .................................. 2011-075914

(51) Int. Cl.
*B41J 2/435* (2006.01)
*B41J 2/47* (2006.01)

(52) U.S. Cl.
USPC .......................................... 347/237; 347/247

(58) Field of Classification Search
USPC .................................. 347/236–238, 246, 247
See application file for complete search history.

(56) References Cited

U.S. PATENT DOCUMENTS

| 8,098,271 | B2 * | 1/2012 | Tsuchiya | ...................... | 347/238 |
| 8,274,539 | B2 * | 9/2012 | Ohno | ............................ | 347/237 |
| 8,368,734 | B2 * | 2/2013 | Tsuchiya et al. | .............. | 347/237 |

FOREIGN PATENT DOCUMENTS

JP 2004-195796 A 7/2004

* cited by examiner

*Primary Examiner* — Hai C Pham
(74) *Attorney, Agent, or Firm* — Marvin A. Motsenbocker; MOTS Law, PLLC

(57) ABSTRACT

A driver device scans and drives light emission elements arranged in a branch connection to a common terminal using scan-circuit and data drive portions and clock driver and waveform shaper circuits. The scan circuit portion has scan circuits connected cascadely to one another with output terminals connected to the light emission elements. The driver device outputs first and second clock signals to odd- and even-numbered scan circuits respectively. The light emission elements are sequentially driven from a first to a last scan circuit when the second-clock signal is applied to the first scan circuit. The data-drive portion drives the common terminal. The clock-driver circuit outputs first and second clock pulses with different phases, and a third-clock pulse synchronized with the first and second clock pulses. The waveform-shaper circuit re-shapes the waveforms of the clock signals.

22 Claims, 10 Drawing Sheets

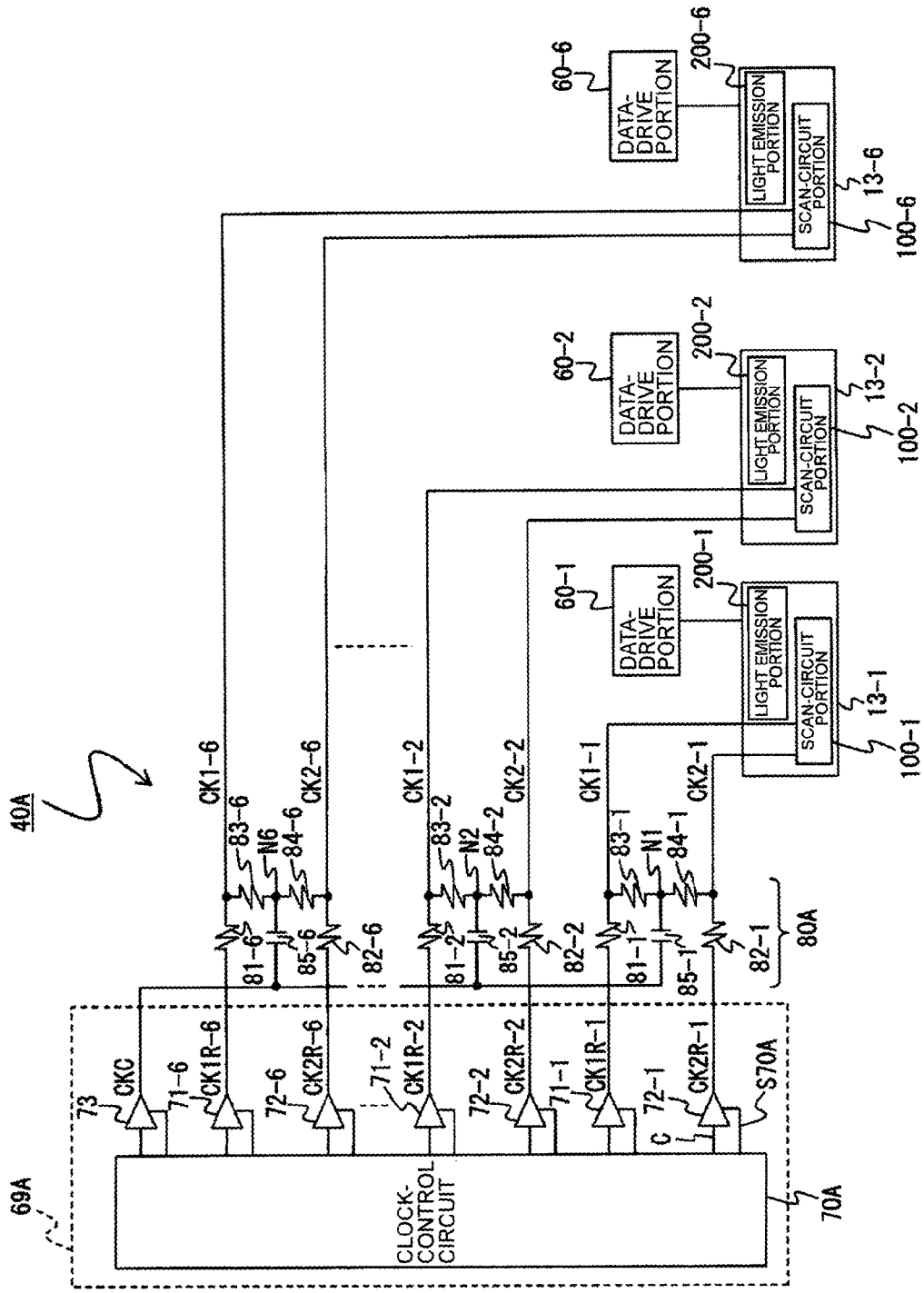

DRIVER DEVICE, PRINT HEAD, AND IMAGE FORMATION APPARATUS

CROSS REFERENCE TO RELATED APPLICATIONS

This application claims priority based on 35 USC 119 from prior Japanese Patent Application No. 2011-075914 filed on Mar. 30, 2011, entitled "DRIVER DEVICE, PRINT HEAD, AND IMAGE FORMATION APPARATUS", the entire contents of which are incorporated herein by reference.

BACKGROUND OF THE INVENTION

1. Field of the Invention

The present disclosure relates to a driver device to drive multiple light emission elements, a print head including the driver device, and an image formation apparatus.

2. Description of Related Art

Some conventional image formation apparatuses using electrophotography include an exposure portion formed by arranging multiple light emission thyristors as light emission elements. In such conventional image formation apparatuses that employ light emission thyristors, (of a number N where N>1), the light emission thyristors are provided per driver circuit. In addition, the position of a light emission thyristor to be illuminated is designated by using the gate of the light emission thyristor, and the illuminating power is controlled by a value of the current flowing between the anode and the cathode.

Print heads having a configuration termed as a self-scan type are already known as print heads using light emission thyristors. If a conventional self-scan type print head needs to be driven with a source voltage of, for example, 3.3 V, the source voltage of 3.3 V is not high enough to generate a gate-trigger current. An already-known technique to compensate for the shortfall is to generate a gate-trigger current by adding up the 3.3-volt source voltage and an undershoot voltage caused in the waveform of the transfer clock signal (hereinafter, "clock signal" is referred to as a "clock").

For example, a technique disclosed in Japanese Patent Application Publication No. 2004-195796 generates a transfer-clock waveform by a clock driver circuit including two output terminals, i.e., first and second output terminals, as follows. The clock driver circuit transmits a transfer clock via the first output terminal to a CR differential circuit to generate an undershoot waveform, while transmitting the DC component via the second output terminal. Note that the reason why the two output terminals are provided for each transfer clock in the clock-driver circuit is that the CR differential circuit is incapable of transmitting the DC component.

SUMMARY OF THE INVENTION

The conventional self-scan type print head needs two output terminals for each transfer clock in the clock-driver circuit, and, as a result, has the following problems.

To achieve faster operations, the print head is provided with multiple self-scan type thyristor-array chips, which are designed to operate simultaneously in parallel. Two clocks are used as the data-transfer clocks to the thyristor-array chips, and two clocks are inputted for each thyristor-array chip. Hence, the clock-driver circuit of each self-scan type print head needs four output terminals for driving each thyristor-array chip.

Because the print head is provided with the multiple self-scan type thyristor-array chips, the total number of output terminals that the clock-driver circuit needs to include is vast. In order to hold the number of output terminals small enough to be accommodated in a package of a large scale integrated circuit (hereinafter referred to as a "LSI"), many chips need to be connected in parallel to, and driven by, the clock-driver circuit, and thereby waveform distortion takes place. This causes a problem of the incapability of speeding-up the operations of the print head.

There has been a demand for a circuit configuration capable of generating clocks for the self-scan type light emission-element array chips without increasing the number of terminals which can be accommodated in an LSI package to drive the print head.

A first aspect of the invention is a driver device to drive light emission elements arranged in a branch connection to a common terminal. The driver device includes a scan-circuit portion including scan circuits that are connected to one another in a cascade manner and include output terminals connected to the light emission elements on a one-to-one basis. A first-clock terminal, from which to output a first clock signal, is connected to odd-numbered scan circuits, and a second-clock terminal, from which to output a second clock signal, is connected to even-numbered scan circuits. The scan circuit portion configured to scan and drive the light emission elements sequentially from a first scan circuit to a last scan circuit once the second-clock signal is applied to the first scan circuit. The driver device further includes: a data-drive portion configured to drive the common terminal; a clock-driver circuit including a first output terminal from which to output a first-clock pulse, a second output terminal from which to output a second-clock pulse that is different in phase from the first-clock pulse, and a third output terminal from which to output a third-clock pulse synchronized with the first-clock pulse and the second-clock pulse; and a waveform-shaper circuit including a first resister connected between a node and a point between the first output terminal and the first-clock terminal, a second resistor connected between the node and a point between the second output terminal and the second-clock terminal, a capacitor connected between the third output terminal and the node, the waveform-shaper circuit configured to re-shape a waveform of the first clock signal to be outputted to the first-clock terminal and a waveform of the second clock signal to be outputted to the second-clock terminal.

A second aspect of the invention is a print head including: the main light emission portions according to the first aspect; and the driver device according to the first aspect.

A third aspect of the invention is a driver device to drive main light emission portions each including light emission elements arranged in a branching connection to a common terminal. The driver device includes: scan-circuit portions each including scan circuits that are connected to one another in a cascade manner and include output terminals connected to the light emission elements on a one-to-one basis, wherein a first-clock terminal, from which to output a first clock signal, is connected to odd-numbered scan circuits in each scan portion, and a second-clock terminal, from which to output a second clock signal, connected to even-numbered scan circuits in each scan portion, wherein each scan-circuit portion is configured to scan and drive the light emission elements sequentially from a first scan circuit to a last scan circuit once the second-clock signal is applied to the first scan circuit; and data-drive portions wherein each data-drive portion is configured to drive the common terminal of a corresponding scan-circuit portion; a clock-driver circuit including first output terminals from which to output first-clock pulses, second output terminals from which to output second-clock pulses that are different in phase from the first-clock pulses, and a third output terminal from which to output a third-clock pulse synchronized with the first-clock pulses and the second-clock pulses; and a waveform-shaper circuit including first resisters each connected between a corresponding node and a point between the corresponding first output terminal and the corresponding first-clock terminal, second resisters each connected between the corresponding node and a point between the corresponding second output terminal and the corresponding second-clock terminal, capacitors each connected between the corresponding third output terminal and the corresponding node, wherein the waveform-shaper circuit is configured to re-shape waveforms of the first clock signals to be outputted to the first-clock terminals and waveforms of the second clock signals to be outputted to the second-clock terminals.

A forth aspect of the invention is a print head including: the main light emission portions according to the third aspect; and the driver device according to the third aspect.

A fifth aspect of the invention is an image formation apparatus including the print head according to the second aspect.

A sixth aspect of the invention is an image formation apparatus including the print head according to the fourth aspect.

According to the first to the fourth aspects, the first, second and third clock pulses outputted from the clock-driver circuit are subjected to waveform shaping performed by the waveform-shaper circuit to generate the first and second clocks, and the first and second clocks are used to drive the scan-circuit portion. Hence, the number of output terminals in the clock-driver circuit can be reduced from what the conventional technique needs to have. Accordingly, not only can an improvement in the data-transfer speed of the print head be achieved, but also the reduced number of output terminals of the clock-driver circuit can contribute to the scaling-down of the circuit and to a cost reduction as a result of the scaling down.

According to the fifth and sixth aspects, the use of the print head of the second and fourth aspects helps provide a high-quality image formation apparatus that has both an excellent space efficiency and an excellent light-extraction efficiency.

BRIEF DESCRIPTION OF THE DRAWINGS

FIG. 9 is a block diagram schematically illustrating the circuit configurations of a print controller and a print head according to a second embodiment of the invention.

DETAILED DESCRIPTION OF EMBODIMENTS

Figure 1:
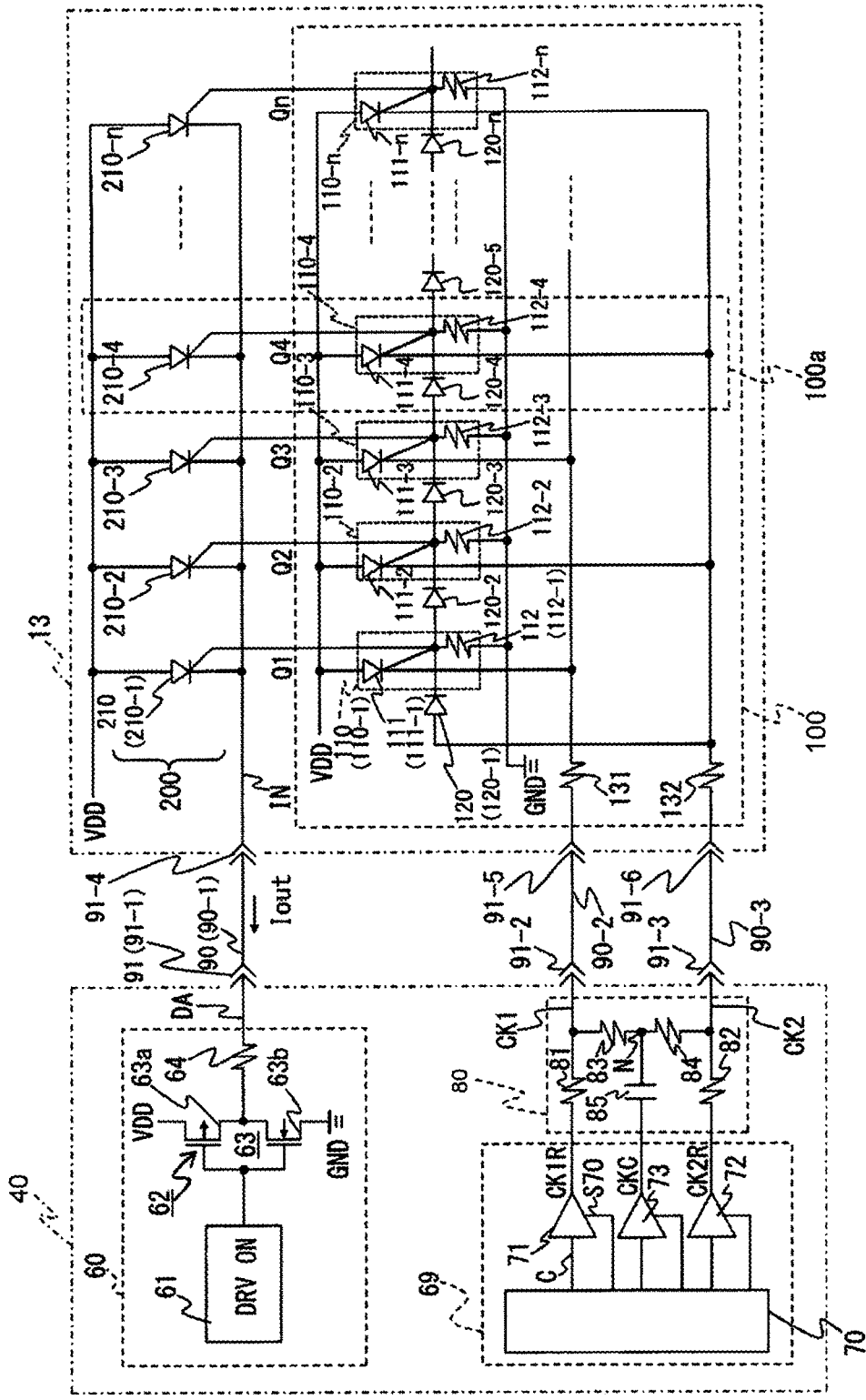
FIG. 1 is a block diagram schematically illustrating the circuit configurations of print controller 40 and print head according to a first embodiment of the invention, which are shown in FIG. 5.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

First Embodiment

Image Formation Apparatus of First Embodiment

Figure 2:
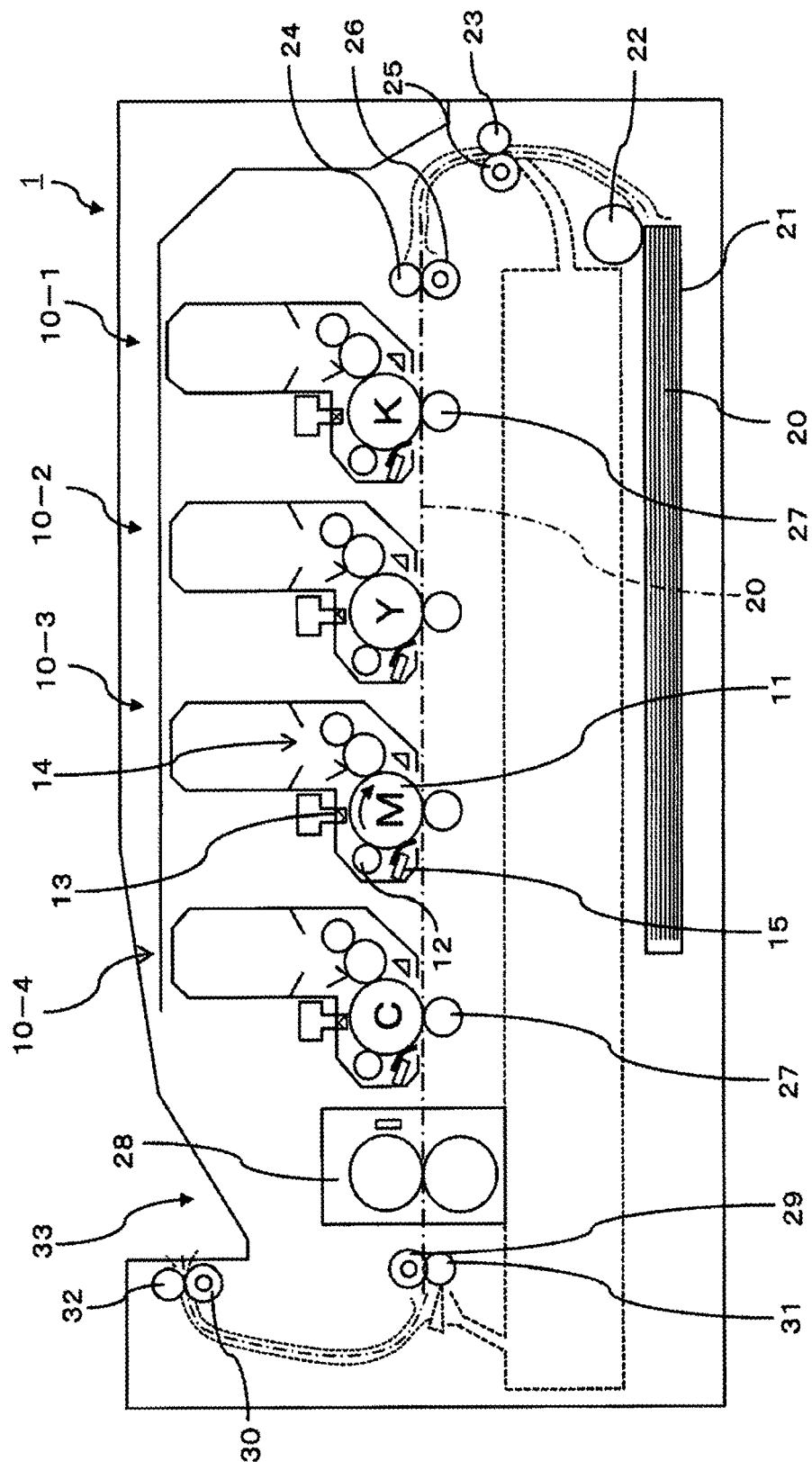
FIG. 2 is a diagram schematically illustrating the configuration of an image formation apparatus according to the first embodiment of the invention.

FIG. 2 is a diagram schematically illustrating an image formation apparatus according to a first embodiment of the invention.

Image formation apparatus 1 is a tandem-type electrophotographic color printer equipped with an exposure device (e.g., a print head) including a semiconductor composite device that has a light emission-thyristor array employing elements to be driven (e.g., three-terminal light emission thyristors as light emission elements). Image formation apparatus 1 includes four process units 10-1 to 10-4 configured to form color images of black (K), yellow (Y), magenta (M) and cyan (C), respectively. These four process units 10-1 to 10-4 are arranged in this order from the upstream side along the transportation route of print media (e.g., paper sheets) 20. All of these process units 10-1 to 10-4 have identical internal configurations. Hence, description of the internal configuration of each process unit is provided below by taking process unit 10-3 of magenta color as an example.

In process unit 10-3, photosensitive member (e.g., photosensitive drum) 11, which serves as an image carrier, is placed so that the photosensitive member is capable of rotating in the direction indicated by an arrow in FIG. 2. Around photosensitive drum 11, charger device 12 and print head 13 are provided in this order from the upstream side in this rotating direction. Charger device 12 is configured to electrically charge the surface of photosensitive drum 11 by supplying electrical charges to the surface of photosensitive drum 11. Print head 13 is an exposure device configured to form an electrostatic latent image by selectively casting light onto the electrically charged surface of photosensitive drum 11. In addition, development unit 14 and cleaner device are also provided around photosensitive drum 11. Development unit 14 is configured to produce a visible image as a toner image (a developer image) by adhering toner (developer) of magenta color (a predetermined color) to the surface of photosensitive drum 11 on which the electrostatic latent image is formed. Cleaner device 15 is configured to remove toner that remains on photosensitive drum 11 after the transferring of the visible image from photosensitive drum 11. Drums or rollers used for these units are rotated by the drive power transmitted from a drive-power source (not illustrated) by means of gears or the like.

Sheet cassette 21, in which paper sheets 20 are stored in a stacked state, is attached to a lower portion of image formation apparatus 1. Hopping roller 22 configured to separately transport paper sheets 20 on a one-by-one basis is placed over sheet cassette 21. Transportation roller 25 and register roller 26 are placed at the downstream side of hopping roller 22 in the direction in which paper sheets 20 are transported. Each paper sheet 20 is transported by being held between transportation roller 25 and pinch roller 23, and then is transported to process unit 10-1 by being held between register roller 26 and pinch roller 24 while the orientation of paper sheet 20 is corrected if transported obliquely. Hopping roller 22, transporter roller 25, and register roller 26 are rotated by the drive power transmitted from a drive-power source (not illustrated) by means of gears or the like.

Image-transfer rollers 27, serving as an image transfer unit, made of a semiconductive rubber or the similar material, are placed opposite to photosensitive drums 11 of process units 10-1 to 10-4, respectably. A voltage is applied to each image-transfer roller 27. The applied voltage creates a difference between the surface potential of photosensitive drum 11 and the surface potential of corresponding image-transfer roller 27 at the time of image transfer when the visible image made of toner, which adheres to the surface of photosensitive drum 11, is transferred onto paper sheet 20.

Image-fixation unit 28 is placed at the downstream side of process unit 10-4. Image-fixation unit 28 is a unit including a heater roller and a backup roller, and configured to fix the toner, which is transferred onto paper sheet 20, by applying pressure and heat to the toner. Sheet-discharge rollers 29, 30, pinch rollers 31, 32 of a sheet-discharge section, and sheet-stacker section 33 are provided at the downstream side of image-fixation unit 28. Sheet-discharge rollers 29, 30 transport paper sheet 20, which is discharged from image-fixation unit 28, to sheet-stacker section 33, with paper sheet 20 held between sheet-discharge rollers 29, and pinch rollers 31, 32. The rollers in image-fixation unit 28, sheet-discharge rollers 29, and the like are rotated by the drive power transmitted from a drive-power source (not illustrated) by means of gears or the like.

Image formation apparatus 1 with the configuration described above performs the following operations. Firstly, paper sheets 20 stored in the state of being stacked in sheet cassette 21 are separately transported from the top on a one-by-one basis by hopping roller 22. Then, each paper sheet 20 is transported to an interstice between photosensitive drum and image-transfer roller 27 in process unit 10-1 with paper sheet 20 held between transportation roller 25, register roller 26, and pinch roller 23, 24. After that, while paper sheet 20 is held between photosensitive drum 11 and image-transfer roller 27, the toner image is transferred onto the print surface of paper sheet 20, and simultaneously paper sheet 20 is further transported by the rotation of photosensitive drum 10-1. Similarly, paper sheet 20 consecutively passes through process units 10-2 to 10-4. While passing through the process units, toner images of the corresponding colors are transferred one on the other onto the print surface of paper sheet 20. The above-mentioned toner image of each color is formed by developing the corresponding electrostatic latent image, which is formed by the corresponding print head 13, in the corresponding development unit 14.

After the four toner images are transferred one on the other onto the print surface, paper sheet 20, on which the toner images are fixed by image-fixation unit 28, is then discharged to sheet-stacker section 33 located outside of image formation apparatus 1 by being held between sheet-discharge rollers 29, 30 and pinch rollers 31, 32. A color image is thus formed on paper sheet 20 through the processes described above.
(Print Head of First Embodiment)

Figure 3:
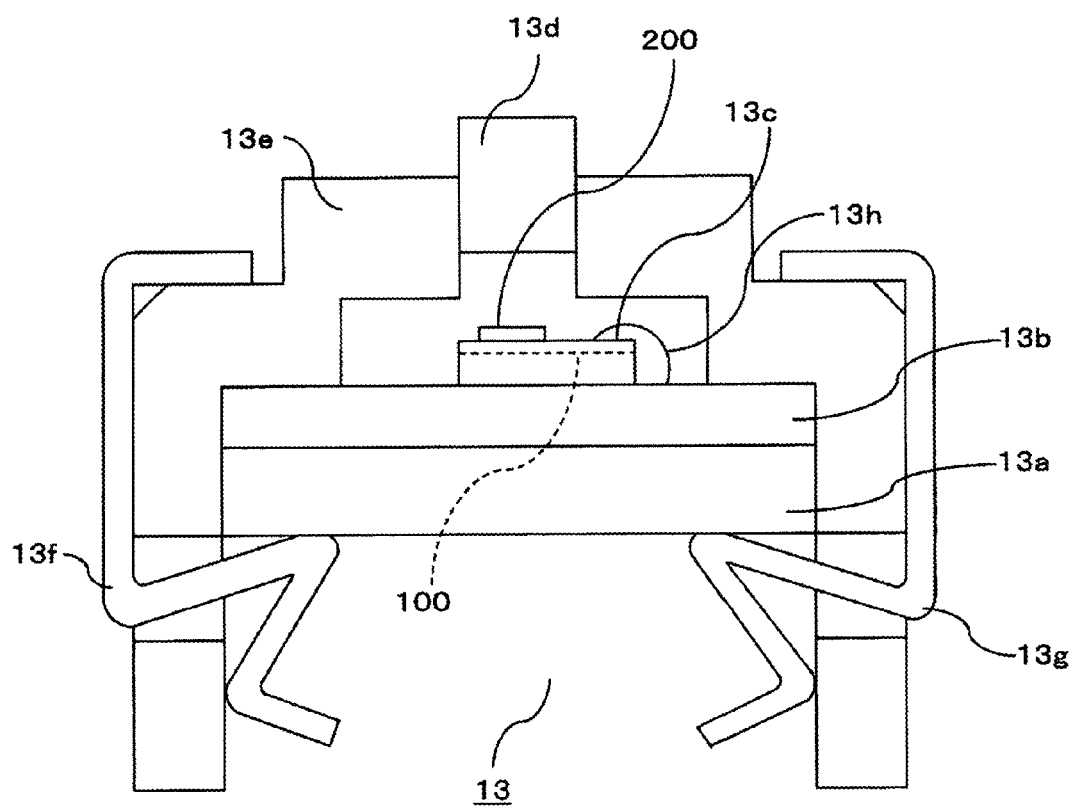
FIG. 3 is a cross-sectional view schematically illustrating the configuration of print head 13 shown in FIG. 2.
Figure 4:
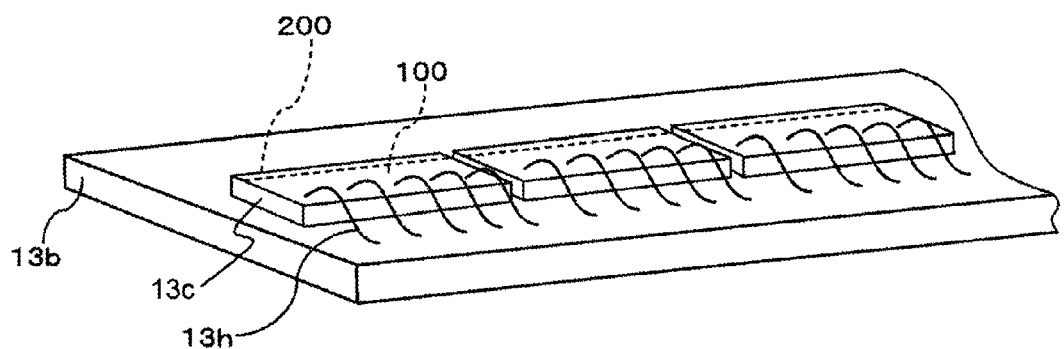
FIG. 4 is a perspective view illustrating a board unit shown in FIG. 3.

FIG. 3 is a sectional view schematically illustrating the configuration of print head 13 shown in FIG. 2. FIG. 4 is a perspective view illustrating a board unit shown in FIG. 3.

Print head 13 shown in FIG. 3 includes base member 13a. A board unit shown in FIG. 4 is fixed to the top of base member 13a. The board unit includes print circuit board 13b and multiple semiconductor integrated circuit (hereinafter referred to as "IC") chips 13c. Print circuit board 13b is fixed to the top of base member 13a. The IC chips 13c are fixed to the top of print circuit board 13b by an adhesive or the like. As a self-scan portion, scan-circuit portion 100 is integrated in each IC chip 13c. Main light emission portion 200 is placed on top of scan-circuit portion 100. In main light emission portion 200, rows of light emission elements (e.g., a light emission-thyristor array) are arranged in a substantially linear fashion. Multiple terminals (not illustrated) of each IC chip 13c and wiring pads (not illustrated) on print circuit board 13b are electrically connected together by bonding wires 13h.

Lens array (e.g., a rod lens array) 13d where multiple, columnar optical elements are arranged is placed over main light emission portions 200 respectively located on multiple IC chips 13c. Rod lens array 13d is fixed to print circuit board 13b with holder 13e. Base member 13a, print circuit board 13b, and holder 13e are fixed by means of clamp members 13f, 13g.
(Printer-Controller Circuit of First Embodiment)

Figure 5:
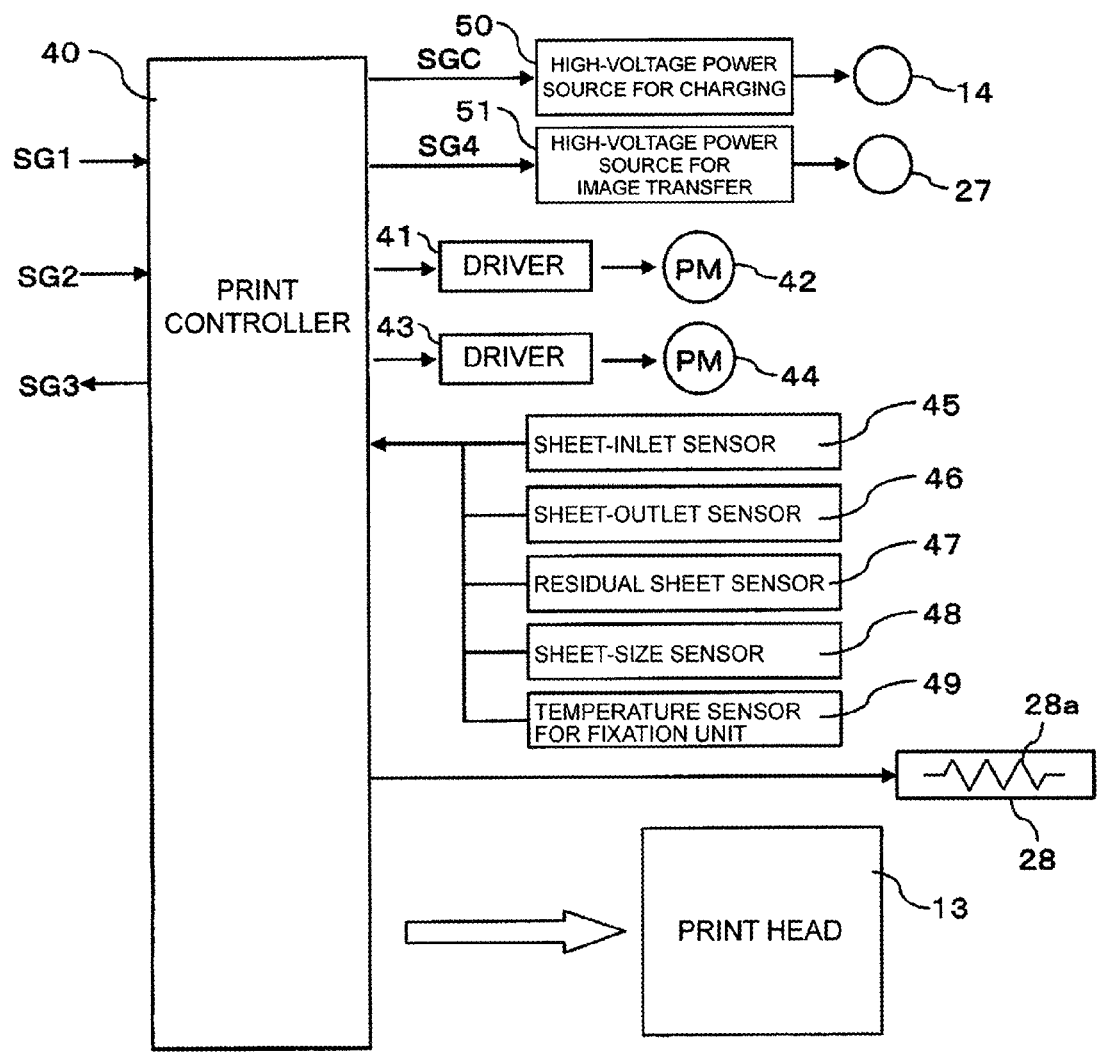
FIG. 5 is a block diagram schematically illustrating the configuration of a printer-controller circuit of image formation apparatus 1 shown in FIG. 2.

FIG. 5 is a block diagram schematically illustrating the configuration of the printer-controller circuit in image formation apparatus 1 shown in FIG. 2. For the sake of a simpler explanation, FIG. 5 illustrates a configuration to control one of the four process units (e.g., process unit 10-3 of magenta color).

The printer-controller circuit shown in FIG. 5 includes print controller 40 placed inside of the print portion of image formation apparatus 1. Print controller 40 includes, among other things, a microprocessor, a read-only memory (ROM), a random access memory (RAM), a timer, and an input/output port through which signals are received and outputted. The printer-controller circuit has a function of making image formation apparatus 1 perform print operations by executing sequence control of the entire printer with control signals SG1, video signals (i.e., one-dimensionally-arranged dot-map data) SG2 and the like coming from a host controller (not illustrated). Print controller 40 is connected to, among other things, print heads of process units 10-1 to 10-4, heater 28a of image-fixation unit 28, drivers 41, 43, sheet-inlet sensor 45, sheet-outlet sensor 46, residual sheet sensor 47, sheet-size sensor 48, temperature sensor 49 for image-fixation unit 28, high-voltage power source 50 for charging, and high-voltage power source 51 for image transfer. Driver 41 is connected to development/image-transfer process motor (PM) 42. Driver 43 is connected to sheet-feed motor (PM) 44. High-voltage power source 50 for charging is connected to development unit 14. High-voltage power source 51 for image transfer is connected to image-transfer roller 27.

The printer-controller circuit with the above-described configuration operates in the following way. Once print controller 40 receives a print instruction through control signal SG1 from the host controller, print controller 40 firstly makes temperature sensor 49 detect whether or not the temperature of heater 28a in image-fixation unit 28 is within a temperature range that renders heater 28a ready for use. If the temperature of heater 28a is not within the temperature range, print controller 40 supplies electric current to heater 28a to raise the temperature of image-fixation unit 28 up to the temperature that renders image-fixation unit 28 ready for use. Then, print controller 40 makes driver 41 drive to rotate development/image-transfer process motor 42, and simultaneously sends charge signal SGC to turn ON high-voltage power source 50 for charging so that development unit 14 is electrically charged.

Then, print controller 40 makes residual sheet sensor 47 detect whether or not paper sheets 20 remain set in sheet cassette 21 shown in FIG. 2, and makes sheet-size sensor 48 detect the size of paper sheets 20 if some still remain. Thereby, the paper feeding suitable for detected paper sheet 20 is started. Note that sheet-feed motor 44 can be rotated bidirectionally by driver 43. Sheet-feed motor 44 is firstly rotated in the reverse direction to feed, by a predetermined amount, paper sheet 20 set in the sheet cassette 21 until sheet-inlet sensor 45 detects paper sheet 20. Then, sheet-feed motor 44 is rotated in the forward direction to transport paper sheet 20 into the print mechanism inside the printer.

At a point of time when paper sheet 20 reaches a printable position, print controller 40 sends timing signal SG3 (including a main-scan synchronization signal and a vertical-scan synchronization signal) to an image-process portion (not illustrated), and receives video signal SG2. Video signal SG2, edited on a page basis by the image-process portion and received by print controller 40, is transferred as print data to each print head 13. Each print head 13 includes scan-circuit portion 100 and main light emission portion 200 both of which are provided for the printing of one dot (pixel).

The sending and receiving of video signal SG2 are performed on a print line basis. The information to be printed by each print head 13 is transformed into a latent image as dots with raised potential on each photosensitive drum (see FIG. 2) charged with a negative potential. Then, in development unit 14, negatively-charged toner for image formation is attracted to the dots by an electric attraction force, and a toner image is thus formed.

Thereafter, the toner image is sent to image-transfer roller 27. Meanwhile, high-voltage power source 51 for image transfer is turned ON with a positive potential by image-transfer signal SG4, and image-transfer roller 27 transfers the toner image onto paper sheet 20 that passes through the interstice between photosensitive drum 11 and image-transfer roller 27. Paper sheet 20 with the transferred toner image is transported while being in contact with image-fixation unit 28 equipped with heater 28a. The heat of image-fixation unit 28 fixes the toner image to paper sheet 20. Paper sheet with the fixed image is transported further, and is discharged from the print mechanism of the printer to the outside of the printer after passing by sheet-outlet sensor 46.

In response to the detection by sheet-size sensor 48 and the detection by sheet-inlet sensor 45, print controller 40 applies a voltage from high-voltage power source 51 for image transfer to image-transfer roller 27 only while paper sheet 20 is passing by image-transfer roller 27. Once the printing is finished and paper sheet 20 passes through sheet-outlet sensor 46, high-voltage power source 50 for charging terminates the application of the voltage to development unit 14, and simultaneously development/image-transfer process motor 42 stops rotating. From then onwards, the operations described above are repeatedly performed.

(Print Controller and Print Head of First Embodiment)

FIG. 1 is a block diagram schematically illustrating the circuit configurations of print controller 40 and print head 13 shown in FIG. 5 according to the first embodiment of the invention.

Print head 13 includes scan-circuit portion 100 and main light emission portion 200 formed on each chip 13c shown in FIG. 4. Scan-circuit portion 100 and main light emission portion 200 are connected to print controller 40 via connection cables 90 (specifically, connection cables 90-1 to 90-3) and connectors 91 (specifically, connectors 91-1 to 91-6).

Main light emission portion 200 scanned by scan-circuit portion 100 includes, for example, multiple P-gate-type light emission thyristors 210 (specifically, 210-1 to 210-$n$) which are three-terminal light emission elements serving as light emission elements. The anode of each of light emission thyristors 210 is connected to a first power source (e.g., a power source of source voltage VDD). The cathode of each of light emission thyristors 210 is connected to connector 91-4 via common terminal IN that allows the flow of drive current Iout serving as data signal (hereinafter, simply referred to as "data") DA. The gate of each of light emission thyristors 210 is connected to the corresponding one of output terminals Q1 to Qn of scan-circuit portion 100. Each of light emission thyristors 210 is an element that emits light in a way that, once trigger current flows through the gate with a source voltage VDD being applied between the anode and the cathode, the path between the anode and the cathode is turned ON, and thus, a cathode current flows. The total number of light emission thyristors 210-1 to 210-$n$ is 4,992 in the case of print head 13 capable of printing an A4-size paper sheet with a 600-dpi resolution. These light emission thyristors are arranged in print head 13.

Scan-circuit portion 100 is a circuit that is driven, by first clock CK1 and second clock CK2, to make a trigger current flow through main light emission portion 200, thereby turning ON/OFF main light emission portion 200. First clock CK1 is supplied to scan-circuit portion 100 from print controller 40 via a CK1 terminal serving as a first-clock terminal, connector 91-2, connection cable 90-2, and connector 91-5. Second clock CK2 is supplied to scan-circuit portion 100 from print controller 40 via a CK2 terminal serving as a second-clock terminal, connector 91-3, connection cable 90-3, and connector 91-6.

Scan-circuit portion 100 includes multiple scan circuits 110 (specifically, 110-1 to 110-$n$; for example, n=4,992) and multiple diodes 120 (specifically, 120-1 to 120-$n$; for example, n=4,992). Each scan circuit 110 uses a three-terminal switch element (e.g., a P-gate-type scan thyristor). Diodes 120 are used as electrical connector device to electrically connect scan circuits 110. Scan-circuit portion 100 is made from a self-scan-type shift register.

Each of scan circuits 110 (i.e., scan circuits 110-1 to 110-$n$) includes one of scan thyristors 111 (i.e., scan thyristors 111-1 to 111-$n$) and one of resisters 112 (i.e., resisters 112-2 to 112-$n$). A first terminal (e.g., the anode) of each of scan thyristors 111 is connected to a VDD power source serving as a first power source. Each resister 112 is connected between the control terminal (e.g., the gate) of the corresponding scan thyristor 111 and a second power source (e.g., the ground GND).

In each of scan thyristor 111-1, 111-3, . . . , 111-($n$−1) of odd-numbered scan circuits 110-1, 110-3, . . . , 110-($n$−1), the anode is connected to the VDD power source, and a second terminal (e.g., the cathode) is connected to connector 91-2 via resister 131, connector 91-5, and connection cable 90-2. The gate of each of odd-numbered scan thyristors 111-1, 111-3, 111-5, . . . , 111-($n$−1) is connected to ground GND via the corresponding one of resisters 112 (i.e., resisters 112-1, 112-3, 112-5, . . . , 112-($n$−1)), and is also connected to the corresponding one of odd-numbered output terminals Q1, Q3, Q5, . . . , Q(n−1).

In each of scan thyristors 111-2, 111-4, . . . , 111-$n$ of even-numbered scan circuit 110-2, 110-4, . . . , 110-$n$, the anode is connected to the VDD power source, and the cathode is connected to connector 91-3 via resister 132, connector 91-6, and connection cable 90-3. The gate of each of even-numbered scan thyristors 111-2, 111-4, . . . , 111-*n* is connected to ground GND via the corresponding one of resisters 112 (i.e., resisters 112-2, 112-4, . . . , 112-*n*), and is also connected to the corresponding one of even-numbered output terminals Q2, Q4, . . . , Qn.

The gate of first scan thyristor 111-1 is connected to connector 91-6 via diode 120-1 of the opposite direction and resister 132. The gates of first to last scan thyristors 111-1 to 111-*n* are connected together via diodes 120-2, 120-3, . . . , 120-*n* of the forward direction. Diodes 120-1 to 120-*n* are provided to determine the scan direction (e.g., the rightward direction in FIG. 1) at the time when light emission thyristors 210-1 to 210-*n* are sequentially turned ON.

Area 100*a*, enclosed by dashed lines in FIG. 1, represents a unit circuit of scan-circuit portion 100 and main light emission portion 200. Scan-circuit portion 100 and main light emission portion 200 includes n unit circuits 100*a* that are connected to one another.

Scan thyristor 111 of each scan circuit 110 is an element which has a layered structure similar to that of each light emission thyristor 210 in main light emission portion 200, and that performs circuit operations similar to those of light emission thyristor 210. Scan thyristor 111, however, needs no light emission function, unlike light emission thyristor 210. For this reason, scan thyristor 111 is overlaid with an optically non-translucent material, such as a metal film, and scan thyristor 111 is thus used in a light-shielded state.

In scan-circuit portion 100, one of scan thyristors 111-1 to 111-*n* is selectively turned ON on the basis of two clocks, namely first and second clocks CK1, CK2 supplied respectively from the CK1 terminal and the CK2 terminal of print controller 40. The ON state is transmitted to main light emission portion 200 to instruct which one of light emission thyristors 210-1 to 210-*n* is to be made to emit light. In scan-circuit portion 100, each time first and second clocks CK1, CK2 are supplied, the ON state of scan thyristor 111 of a particular scan circuit 110 to be turned ON is transmitted to the adjacent scan thyristor 111 and thereby circuit operations similar to those of a shift register are performed.

Print controller 40 that is connected to print head 13 including scan-circuit portion 100 includes multiple data-drive portions 60, clock-driver circuit 69, and waveform-shaper circuit 80. Each of data-drive portions 60 includes data-control circuit 61 and data-driver circuit 62. Data-control circuit 61 outputs drive-command signal DRVON. On the basis of drive-command signal DRVON, data-driver circuit 62 outputs, through a DA terminal, data DA used to time-divisionally divide multiple main light emission portions 200. Clock-driver circuit 69 is a circuit configured to output first-clock pulse CK1R, second-clock pulse CK2R, and third-clock pulse CKC for driving scan-circuit portion 100, respectively, through a CK1R terminal (serving as a first output terminal), a CK2R terminal (serving as a second output terminal), and a CKC terminal (serving as a third output terminal). Waveform-shaper circuit 80 is a circuit configured to re-shape the waveforms of first, second and third-clock pulses CK1R, CK2R and CKC, and to output first and second clocks CK1, CK2 to be supplied to scan-circuit portion 100, respectively, through the CK1 terminal and the CK2 terminal.

For the sake of a simpler explanation, FIG. 1 shows only one data-drive portion 60. Multiple main light emission portions 200 are designed as follows. Multiple main light emission portions 200 include, for example, a total of 4,992 light emission thyristors 210-1 to 210-*n*. These light emission thyristors 210-1 to 210-*n* are divided into multiple light emission thyristor groups. These light emission thyristor groups are divisionally driven simultaneously in parallel by data-drive circuits 60 which are provided, respectively, to the groups.

Let us cite a typical design as an example. Twenty-six arrayed chips of main light emission portion 200, in each of which 192 light emission thyristors 210 (i.e., 210-1 to 210-*n*) are arranged, are arranged on top of print circuit board 13*b* shown in FIG. 4. Thereby, the total of 4,992 light emission thyristors 210-1 to 210-*n* needed for print head 13 are configured. In this case, data-drive portions 60 are provided, respectively, to 26 main light emission portions 200. The total number of output terminals, respectively, of data-drive portions 60 is 26.

On the other hand, clock-driver circuit 69 and waveform-shaper circuit 80 drive the arrayed chips in scan-circuit portion 100. Because clock-driver circuit 69 and waveform-shaper circuit 80 need not only generate clocks CK1, CK2, but also control ignition energy of scan thyristors 111, it is desirable that a set of clock-driver circuit 69 and waveform-shaper circuit 80 should be provided to each scan-circuit portion 100 in order for print head 13 to achieve fast operations. If, however, slow data transfer of print head 13 is tolerable, clock-driver circuit 69 and waveform-shaper circuit 80 may be shared among multiple scan-circuit portions 100 by connecting the output terminals of clock-driver circuit 69 and waveform-shaper circuit 80 to multiple scan-circuit portions 100 in parallel.

Data-drive portions 60, clock-driver circuit 69, waveform-shaper circuit 80, and scan-circuit portions 100 together form the driver device of the first embodiment. Note that although data-drive portions 60, clock-driver circuit 69, and waveform-shaper circuit 80 are placed in print controller 40 in FIG. 1, data-drive portions 60, clock-driver circuit 69, and waveform-shaper circuit 80 may be placed in print head 13 instead.

Each data-drive portion 60 includes data-control circuit 61 configured to output drive-command signal DRVON, and data-driver circuit 62 that is connected to the output side of data-control circuit 61. Data-driver circuit 62 includes complementary MOS (CMOS) inverter 63 and resister 64. CMOS inverter 63 is made from a CMOS transistor configured to invert drive-command signal DRVON. Resister 64 is connected between the output terminal of CMOS inverter 63 and the DA terminal. CMOS inverter 63 includes P-channel MOS (PMOS) transistor 63*a* and N-channel MOS (NMOS) transistor 63*b*, which are connected in series to each other between the VDD power source and ground GND.

In PMOS 63*a*, the gate receives the input of drive-command signal DRVON, the source is connected to the VDD power source, and the drain is connected to a first end of resister 64. In NMOS 63*b*, the gate receives the input of drive-command signal DRVON, the source is connected to ground GND, and the drain is connected to the first end of resister 64. A second end of resister 64 is connected to the DA terminal. The DA terminal is connected commonly to the cathodes of multiple light emission thyristors 210 via connector 91-1, connection cable 90-1, connector 91-4, and common terminal IN of print head 13. The DA terminal is a terminal through which drive current Iout—the cathode current at the time when multiple light emission thyristors 210 are driven consecutively—flows into data-drive portion 60.

Clock-driver circuit 69 includes clock-control circuit and three-state-type first, second, and third output buffers 71, 72, 73. Clock-control circuit 70 outputs three drive signals C and three control signals S70. The operation states of first, second and third output buffers 71, 72, 73 are controlled by control signals S70, respectively. First, second, and third output buffers 71, 72, 73 respectively drive three drive signals C. First, second and third output buffers 71, 72, 73 output first, second and third-clock pulses CK1R, CK2R, CKC, respectively, through the CK1R terminal (serving as a first output terminal), the CK2R terminal (serving as a second output terminal) and the CKC terminal (serving as a third output terminal).

Three-state-type first, second and third output buffers 71, 72, 73 all have the same circuit configuration. First, second and third output buffers 71, 72, 73 are circuits: which drive received drive signals C, and thereby output first, second and third clock pulses CK1R, CK2R, CKC of either a high level (hereinafter, simply referred to as a "H level") or a low level (hereinafter, simply referred to as a "L level"), respectively, when control signals S70 are at the H level; and whose output terminals enter into a high-impedance (hereinafter, simply referred to as "Hi-Z") state, respectively, when control signals S70 are at the L level. The use of such three-state-type first, second and third output buffers 71, 72 73 makes it possible to generate the drive-signal waveform that is suitable for the gate trigger of scan thyristors 111 by putting the output terminals into the Hi-Z output state during the signal transition of the output signals from the H level to the L level or from the L level to the H level.

Waveform-shaper circuit 80 is connected to the CK1R terminal, the CK2R terminal and the CKC terminal of clock-driver circuit 69. Waveform-shaper circuit 80 includes resister 81, resister 82, first resister 83, second resister 84, and capacitor 85. Resister 81 is connected between the CK1R terminal and the CK1 terminal. Resister 82 is connected between the CK2R terminal and the CK2 terminal. First resister 83 is connected between node N and a point between resister 81 and the CK1 terminal. Second resister 84 is connected between node N and a point between the CK2R terminal and the CK2 terminal. Capacitor 85 is connected between the CKC terminal and node N.

Note that although resisters 81, 82 are provided in FIG. 1, resisters 81, 82 may be eliminated in a case where the resistance values of resisters 81, 82 can be reduced to almost zero depending on the drive capacity of clock-driver circuit 69 Likewise, both of resisters 131, 132 may be eliminated from each scan-circuit portion 100.

(Light Emission Thyristor of First Embodiment)

Figure 6C:
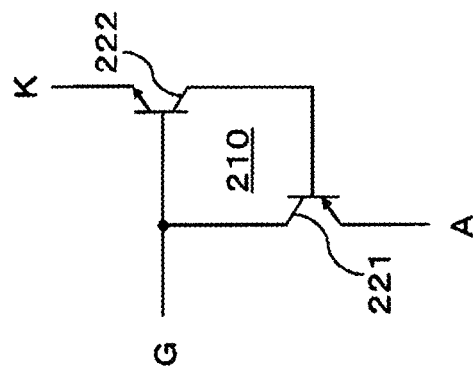
FIGS. 6A to 6C illustrate the configuration of light emission thyristor 210 shown in FIG. 1.
Figure 6B:
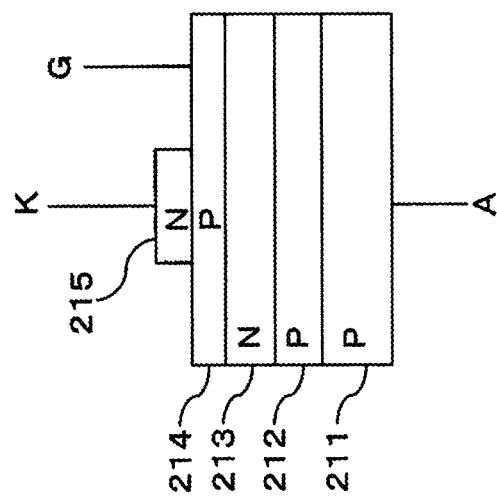
Figure 6A:
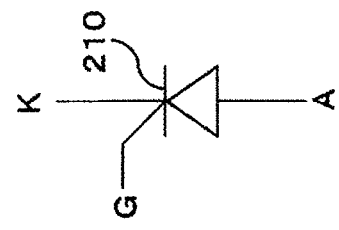

FIG. 6A to 6C are diagrams each illustrating the configuration of each light emission thyristor 210 shown in FIG. 1.

FIG. 6A shows the circuit symbol of light emission thyristor 210. Light emission thyristor 210 has three terminals—i.e., anode A, cathode K, and gate G.

FIG. 6B is a diagram illustrating the sectional structure of light emission thyristor 210. Light emission thyristor 210 is manufactured by epitaxially growing a predetermined crystal on top of P-type GaAs wafer base material 211 using a publicly-known MO-CVD (metal organic-chemical vapor deposition) method.

To put it specifically, a wafer with a four-layered structure including PNPN layers is formed on top of P-type GaAs wafer base material 211 by sequentially stacking P-type layer 212 made of AlGaAs material containing P-type impurities, N-type layer 213 made of AlGaAs material containing N-type impurities, P-type layer 214 made of AlGaAs material containing P-type impurities, and N-type layer 215 made of AlGaAs material containing N-type impurities, on P-type GaAs wafer base material 211. Subsequently, device isolation is performed by forming groove portions using a publicly-known etching method.

During the etching process, gate G is formed by exposing an area of P-type layer 214, and forming a metal interconnection in the exposed area. Likewise, cathode K is formed by exposing an area of the uppermost N-type layer 215, and forming a metal interconnection in a portion of the exposed area. After that, anode A is formed by forming a metal electrode on the bottom surface of P-type GaAs wafer base material 211.

Each scan thyristor 110 shown in FIG. 1 has the same internal structure as does light emission thyristor 210.

FIG. 6C is a diagram of an equivalent circuit of light emission thyristor 210 depicted in contrast with the FIG. 6B. Light emission thyristor 210 includes PNP transistor (hereinafter simply referred to as a "PNPTR") 221 and NPN transistor (hereinafter simply referred to as a "NPNTR") 222. The emitter of PNPTR 221 corresponds to anode A of light emission thyristors 210, the base of NPNTR 222 corresponds to gate G of light emission thyristors 210, and the emitter of NPNTR 222 corresponds to cathode K of light emission thyristors 210. The collector of PNPTR 221 is connected to the base of NPNTR 222, and the base of PNPTR 221 is connected to the collector of NPNTR 222.

Note that although light emission thyristor 210 shown in FIG. 6 has the structure in which the AlGaAs layers are formed on top of GaAs wafer base material 211, the structure of light emission thyristor 210 is not limited to this. A structure using materials such as GaP, GaAsP, AlGaInP and InGaAsP may be used instead. Alternatively, a structure in which layers of such materials as GaN, AlGaN and InGaN are formed on top of a silicon substrate, and a sapphire substrate, may be used.

(Outline of Operations of Print Controller and Print Head of First Embodiment)

If, for example, in the configuration shown in FIG. 1, drive-command signal DRVON outputted from data-control circuit 61 is at the L level, the output terminal of CMOS inverter 63 in data-driver circuit 62 becomes at the H level (≈source voltage VDD). Hence, common terminal IN and the cathodes of light emission thyristors 210 in print head 13 are raised to the H level via resister 64, the DA terminal, connector 91-1, connection cable 90-1, and connector 91-4. As a result, the voltage between the anode and the cathode of each light emission thyristor 210 becomes almost 0 V, and thereby drive current Iout flowing there becomes zero. Consequently, all light emission thyristors 210-1 to 210-$n$ become in the non-light emission state.

If, in contrast, the drive-command signal DRVON is at the H level, the output terminal of CMOS inverter 63 becomes at the L level. Hence, common terminal IN and the cathodes of light emission thyristors 210 in print head 13 become almost equal to the GND potential (≈0 V) via resister 64, the DA terminal, connector 91-1, connection cable 90-1 and connector 91-4. Consequently, a voltage almost equal to source voltage VDD is applied between the anode and the cathode of light emission thyristor 210.

In this case, the gate of only light emission thyristor 210, commanded to emit light by scan-circuit portion 100, which starts the shift operation with the H level of second clock CK2 supplied via diode 120-1, is selectively put at the H level, and the trigger current is generated in the gate of light emission thyristor 210, and thus, the light emission thyristors 210 commanded to emit light are turned ON. The current that flows through the cathode of light emission thyristors 210 which is turned ON is a current that flows into the DA terminal (i.e., drive current Iout). Light emission thyristor 210 is put into the light emission state, and generates a light emission output in accordance with the value of drive current Iout.

Let us draw attention to scan thyristors 111 (i.e., 111-1 to 111-$n$) which are turned ON respectively in scan-circuit portions 100 in order to discuss how light emission thyristors 210-1 to 210-$n$ work. Source voltage VDD is applied to the anode of each light emission thyristor 210. If the cathode is put into the L level, a voltage is applied between the anode and the cathode of light emission thyristor 210. On the other hand, because the gates of scan thyristors 111 in each scan-circuit portion 100 are respectively connected to the gates of light emission thyristors 210, a voltage is also applied between the gate and the cathode of each scan thyristor 111. At this moment, once out of light emission thyristors 210-1 to 210-*n*, only the gate of light emission thyristor 210 commanded to emit light by scan-circuit portion 100 is selectively put at the H level, the trigger current is generated in the gate of light emission thyristor 210, and thus, the light emission thyristor 210 commanded to emit light is turned ON. In this event, the current that flows through the cathode of light emission thyristor 210 is drive current Iout that flows into the DA terminal. Light emission thyristor 210 is put into the light emission state, and generates a light emission output in accordance with the value of drive current Iout.

(Detailed Operations of Print Controller and Print Head of First Embodiment)

Figure 7:
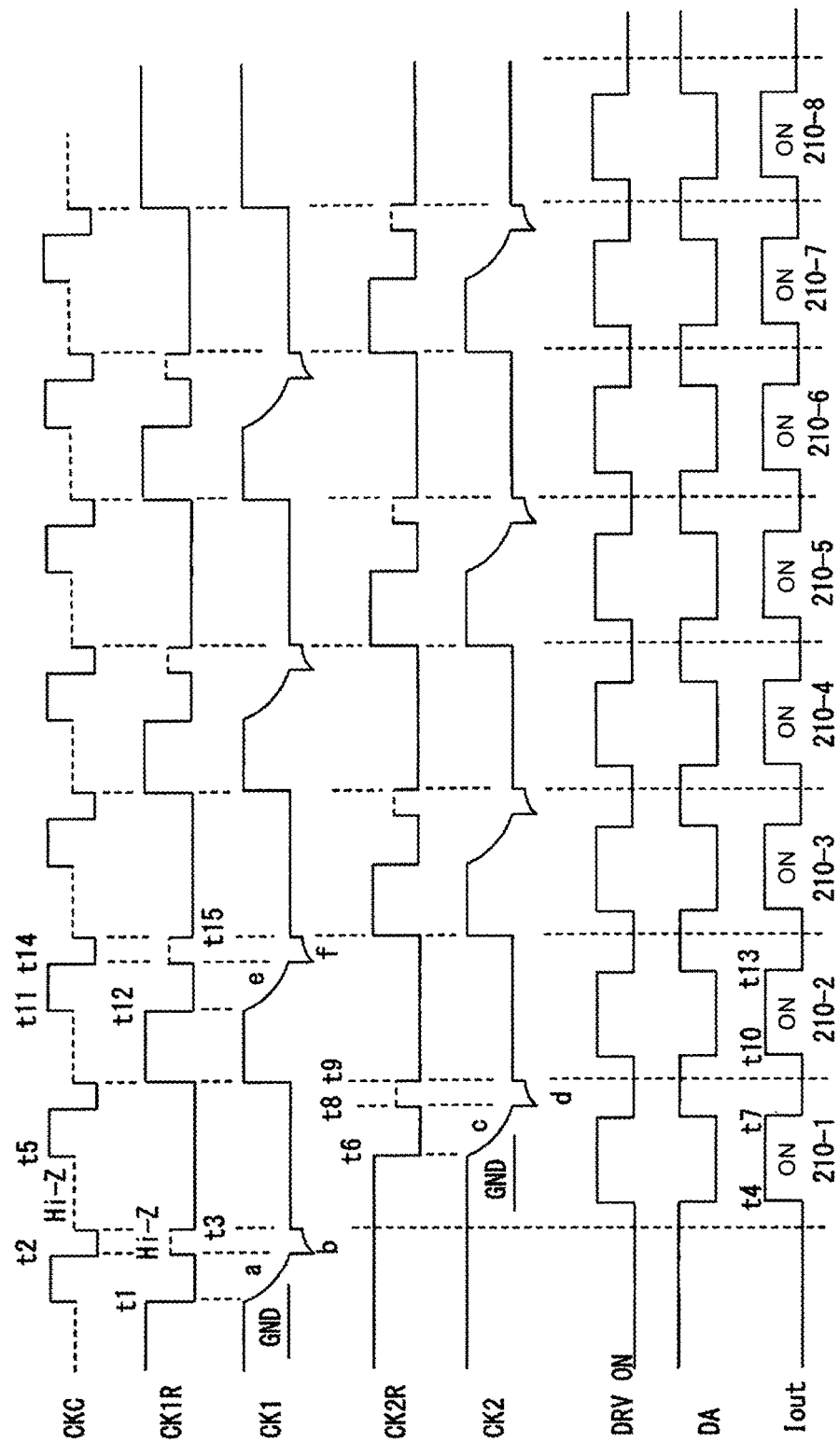
FIG. 7 is a timing chart illustrating the operations of print controller 40 and print head 13 shown in FIG. 1.

FIG. 7 is a timing chart illustrating detailed operations of print head 13 and print controller 40 shown in FIG. 1.

FIG. 7 shows the waveforms representing the operations performed when light emission thyristors 210-1 to 210-*n* (e.g., n=8, . . . ) shown in FIG. 1 are made to emit light consecutively for one line scan during the print operations of image formation apparatus 1 shown in FIG. 2.

First and second clocks CK1, CK2 supplied from print controller 40 are used in the case of scan-circuit portion 100 using scan thyristors 111, like in the first embodiment.

First and second clocks CK1, CK2 are generated by making waveform-shaper circuit 80 re-shape first, second, and third-clock pulses CK1R, CK2R, CKC outputted respectively from three-state-type output buffers 71, 72, 73 in clock-driver circuit 69.

While in the state before time t1 which is shown in the left end portion in the timing chart of FIG. 7, clock pulses CK1R, CK2R are at the H level, and clock pulse CKC is in the Hi-Z state as shown by a dashed line. The H levels of clock pulses CK1R, CK2R are transmitted respectively to the CK1 terminal via resister 81, and to the CK2 terminal via resister 82. Hence, clock CK1 outputted from the CK1 terminal and clock CK2 outputted from the CK2 terminal become at the H level. H-level clock CK1 is supplied to resister 131 in scan-circuit portion 100 via connection cable 90-2 and connector 91-5, whereas H-level clock CK2 is supplied to resister 132 in scan circuit portion 100 via connection cable 90-3 and connector 91-6. Hence, the cathodes of the sets of odd-numbered scan thyristors 111-1, 111-3, . . . , 111-(*n*−1) and the cathodes of the sets of even-numbered scan thyristor 111-2, 111-4, . . . , 111-*n* become at the H level. Accordingly, the voltage between the anode and the cathode of each of scan thyristors 111-1 to 111-*n* becomes almost zero, so that all the scan thyristors 111-1 to 111-*n* come to be in the OFF state.

At that moment, drive-command signal DRVON outputted from data-control circuit 61 is at the L level. The L level drive-command signal DRVON is inverted by CMOS inverter 63, and thereby the DA terminal becomes at the H level. The H level of the DA terminal is transmitted to common terminal IN in main light emission portion 200 via connector 91-1, connection cable 90-1, and connector 91-4. Hence, the cathodes of light emission thyristors 210-1 to 210-*n* become at the H level, and thus the voltage between the anode and the cathode of each of light emission thyristors 210-1 to 210-*n* becomes small enough to turn all of light emission thyristors 210-1 to 210-*n* into the OFF state like scan thyristor 111-1 to 111-*n*. Consequently, drive current Iout becomes zero.

In the following sections, descriptions are provided for the processes (1) to (3) of turning ON first, second and third scan thyristors 111-1, 111-2, 111-3, respectively, as well as a comparison (4) between the first embodiment and a comparative example.

(1) Process of Turning ON First Scan Thyristor 111-1

At time t1, the CK1R terminal of clock-driver circuit 69 drops to the L level, and the CKC terminal rises to the H level. Hence, a current is generated which flows in a direction from output buffer 73 to the CKC terminal, capacitor 85, node N, resisters 83 and 81, the CK1R terminal, and output buffer 71. Accordingly, a charging current is generated in capacitor 85, and thus the voltage between the two terminals of capacitor 85 becomes higher. Consequently, the potential of the CK1 terminal drops to the GND potential, as shown in the a section.

At time t2, the CKC terminal rises to the L level, and the CK1R terminal becomes in the Hi-Z state as indicated by a horizontal dashed line in FIG. 7 representing an intermediate potential. Hence, an undershoot waveform occurs in clock CK1, as shown in the b section. The undershoot waveform is caused by the charging voltage of capacitor 85.

Although not illustrated, a parasitic diode is produced in the output portion of three-state-type output buffer 71. The occurrence of the undershoot waveform causes a current to flow through the parasitic diode. Hence, the level of the negative potential of the undershoot waveform is cramped by the parasitic diode. Consequently, as shown in the b section, the minimum point of the undershoot waveform has a negative voltage of no more than approximately −0.6 V. After that, the electrical charges stored in capacitor 85 are self-discharged, and the voltage between the two terminals of capacitor 85 accordingly becomes lower. Thereby, the undershoot portion shown in the b section disappears as the time passes.

Because of the occurrence of the undershoot portion of the b section in clock CK1, a relatively large voltage is applied between the anode and the cathode of scan thyristor 111-1 via resister 131. At that moment, the CK2 terminal is at the H level, so that a trigger current is generated between the gate and the cathode of scan thyristor 111-1 via resister 132 and diode 120-1 and the trigger current turns ON scan thyristor 111-1.

To put it specifically, the above-described current path is a path which starts at the CK2 terminal at the H level, and passes through resister 132, diode 120-1, the route between the gate and the cathode of scan thyristor 111-1, and resister 131, as well as reaches the CK1 terminal with a negative potential due to the occurrence of undershoot. The current passes through resister 83, node N, capacitor 85, the CKC terminal at the L level, and output buffer 73. The trigger current thus flowing between the gate and the cathode of scan thyristor 111-1 turns ON scan thyristor 111-1, and the ON state continues until the CK1 terminal on the cathode side of scan thyristor 111-1 becomes at the H level.

At time t3, the CKC terminal becomes in the Hi-Z state, and the CK1R terminal drops to the L level. Hence, the CK1 terminal becomes at the L level as well.

At time t4, for the purpose of issuing light-emission command for light emission thyristor 210-1, drive-command signal DRVON rises to the H level. The H level of drive-command signal DRVON is inverted by CMOS inverter 63, so that the DA terminal drops to the L level.

The gate of light emission thyristor 210-1 and the gate of scan thyristor 111-1 are connected to each other. In addition, as described above, scan thyristor 111-1 is in the ON state. For these reason, the gate potential is at the H level. Consequently, at time t4, once the DA terminal becomes at the L level and the cathode potential of light emission thyristors 210-1 becomes at the L level, a trigger current is generated between the gate and the cathode of light emission thyristor 210-1, and the trigger current turns ON light emission thyristor 210-1.

At time t7 after times t5 and t6, once drive-command signal DRVON drops to the L level, the L level of drive-command signal DRVON is inverted by CMOS inverter 63, so that the DA terminal rises to the H level. Hence, the voltage between the anode and the cathode of light emission thyristor 210-1 becomes lower, so that light emission thyristor 210-1 is turned OFF.

(2) Process of Turning ON Second Scan Thyristor 111-2

Before time t7, once the CKC terminal rises to the H level at time t5, the CK2R terminal drops to the L level at time t6 following time t5. Hence, a charging current is produced in a direction from the CKC terminal at the H level to capacitor 85, node N, resisters 84, 82, and the CK2R terminal. The charging current raises the voltage between the two terminals of capacitor 85. As a result, the potential of the CK2 terminal drops to the GND potential, as shown in the c section.

At time t8, the CK2R terminal becomes in the Hi-Z state as indicated by the horizontal dashed line representing an intermediate potential. Substantially, the CKC terminal drops to the L level. Hence, an undershoot waveform occurs in clock CK2, as indicated in the d section. The undershoot waveform is caused by the charging voltage of capacitor 85.

Although not illustrated, a parasitic diode is produced in the output portion of three-state-type output buffer 72. The occurrence of the undershoot waveform in clock CK2 causes a current to flow through the parasitic diode. Hence, the potential of the undershoot waveform is cramped to a negative-potential level. Consequently, as shown in the d section, the minimum point of the undershoot waveform has a negative voltage of no more than approximately −0.6 V. After that, the electrical charges stored in capacitor 85 are self-discharged, and the voltage between the two terminals of capacitor 85 accordingly becomes lower. Thereby, the undershoot portion shown in the d section disappears as the time passes.

The occurrence of the undershoot waveform of the d section in clock CK2 caused a relatively large voltage to be applied between the anode and the cathode of scan thyristor 111-2. At that moment, the CK1 terminal is at the L level, and the scan thyristor 111-1 is still in the ON state with the gate potential being at the H level. Hence, a trigger current is generated between the gate and the cathode of scan thyristor 111-2 via diode 120-2, and the trigger current turns ON scan thyristor 111-2.

To put it specifically, the above-described current path starts at the gate of scan thyristor 111-1 at the H level, and passes through diode 120-2 and the path between the gate and the cathode of scan thyristor 120-2 in the forward direction, as well as reaches resistor 132 and the CK2 terminal with a negative potential due to the occurrence of the undershoot. Besides, the current path passes through resister 84, node N, capacitor 85, and the CKC terminal at the L level. The current thus flowing through the gate of scan thyristor 111-2 turns ON scan thyristor 111-2. The ON state continues until the CK2 terminal on the cathode side of scan thyristor 111-2 becomes at the H level.

At time t9, the CK2R terminal becomes at the L level, and the CK2 terminal becomes at the L level. Substantially, the CKC terminal becomes in the Hi-Z state. Simultaneously, at time t9, the CK1R terminal rises to the H level, and the CK1 terminal also rises to the H level. Thereby, scan thyristor 111-1 is turned OFF.

At time t10, for the purpose of issuing a light-emission command for light emission thyristor 210-2, drive-command signal DRVON rises to the H level, and the DA terminal drops to the L level. At that moment, scan thyristor 111-2 is in the ON state, and its gate is at the H level.

The gate of light emission thyristor 210-2 and the gate of scan thyristor 111-2 are connected to each other. For this reason, once the DA terminal becomes at the L level, a trigger current is generated between the gate and the cathode of light emission thyristor 210-2, and the trigger current turns ON light emission thyristor 210-2. The ON state of light emission thyristor 210-2 continues until time t13 after times t11 and t12, when drive-command signal DRVON becomes at the L level and the DA terminal becomes at the H level.

(3) Process of Turning ON Third Scan Thyristor 111-3

At time t11, clock pulse CKC rises to the H level. Substantially, clock pulse CK1R drops to the L level at time t12. Hence, a charging current is produced in a direction from the CKC terminal at the H level to capacitor 85, node N, resisters 83, 81, and the CK1R terminal. The charging current raises the voltage between the two terminals of capacitor 85. As a result, the potential of the CK1 terminal drops to the GND potential, as shown in the e section.

At time t14 after time t13, the CKC terminal drops to the L level. Substantially, the CK1R terminal becomes in the Hi-Z state as indicated by the horizontal dashed line representing the intermediate potential. Hence, an undershoot waveform occurs in clock CK1, as indicated in the f section. The undershoot waveform is caused by the charging voltage of capacitor 85.

Although not illustrated, a parasitic diode is produced in the output portion of three-state-type output buffer 71. The occurrence of the undershoot waveform causes a current to flow through the parasitic diode. Hence, the potential of the undershoot waveform is cramped to a negative-potential level. Consequently, as shown in the f section, the minimum point of the undershoot waveform has a negative voltage that is no more than approximately −0.6 V. After that, the electrical charges stored in capacitor 85 are self-discharged, and the voltage between the two terminals of capacitor 85 becomes lower. Accordingly, the undershoot waveform shown in the f section disappears as the time passes.

Due to the occurrence of the undershoot portion of the f section in clock CK1, a relatively large voltage is applied between the anode and the cathode of scan thyristor 111-3. At that moment, the CK2 terminal is at the L level, and the scan thyristor 111-2 is still in the ON state with the gate potential being at the H level. Hence, a trigger current is generated between the gate and the cathode of scan thyristor 111-3 via diode 120-3, and the trigger current turns ON scan thyristor 111-3. The ON state of scan thyristor 111-3 continues until the CK1 terminal on the cathode side of scan thyristor 111-3 becomes at the H level.

At time t15, the CKC terminal becomes in the Hi-Z state, and the CK1R terminal drops to the L level. Hence, the CK1 terminal also becomes at the L level. Simultaneously, the CK2R terminal rises to the H level, and the CK2 terminal rises to the H level as well. Consequently, scan thyristor 111-2 is turned OFF.

(4) Comparison Between First Embodiment and Comparative Example

As described earlier by use of FIG. 7, two clocks CK1, CK2 have their respective forms whose phases are different from each other, but each of which represents a repeated series of the same waveform. The sequential input of the waveforms, respectively, into the set of odd-numbered scan thyristors 111-1, 111-3, . . . and the set of even-numbered scan thyristors 111-2, 111-4, . . . makes scan thyristors 111-1 to 111-n turned ON consecutively.

The gate-trigger currents for scan thyristors 111-1 to 111-n are generated at the undershoot portions of clocks CK1, CK2 (i.e., the b section, the d section, the f section, and the like). The undershoot waveforms at those moments are generated by capacitor 85. It may be considered that the undershoot waveforms of clock CK1 are generated by differentiating the waveform of clock pulse CKC by use of waveform-shaper circuit 80 including capacitor 85 and resisters 81, 82, 83, 84.

The driving of a self-scan-type thyristor head of a comparative example needs the clock-driver circuit to have two output terminals for each transfer clock. Specifically, as illustrated in FIG. 1 of Patent Document 1 (i.e., a comparative example), its clock-driver circuit needs to be equipped with two output terminals, namely the CK1R terminal and the CK1C terminal to which resister 83 and capacitor 85 are respectively connected, in order to generate clock CK1. In addition, its clock-driver circuit needs to be equipped with two output terminals, namely the CK2R terminal and the CK2C terminal to which resister 84 and another capacitor (i.e., a capacitor other than capacitor 85) are respectively connected, in order to generate clock CK2. In this way, two clock-drive terminals are needed for each transfer clock in order to drive the self-scan-type thyristor head of the comparative example. As a result, the generation of two clocks CK1, CK2 requires four clock-drive terminals.

To achieve faster operations, the self-scan type thyristor head is provided with a large number of self-scan type thyristor-array chips that are simultaneously operated in parallel. In this case, the arrangement of such a large number of self-scan type thyristor-array chips in the self-scan type thyristor head vastly increases the total number of output terminals to be included in the clock-driver circuit.

The clock-driver circuit and the data-drive portion are manufactured by a method of manufacturing LSIs. Hence, a reduction in the total number of output terminals of the clock-driver circuit to a number that allows all the output terminals to be accommodated in the LSI package increases the number of chips that are driven by being connected to the clock-driver circuit in parallel. As a result, waveform distortion occurs. This causes a problem so that faster operations of the print head become unachievable.

The first embodiment of the invention solves the problem by making the three output terminals sufficient for clock-driver circuit 69 to have in order to generate two clocks CK1, CK2—i.e., the drive signals. The first embodiment makes it possible to reduce the number of necessary terminals to three quarters of the number of terminals included in the configuration of the comparative example.

(Description of Undershoot Waveform in FIG. 7)

Figure 8A:
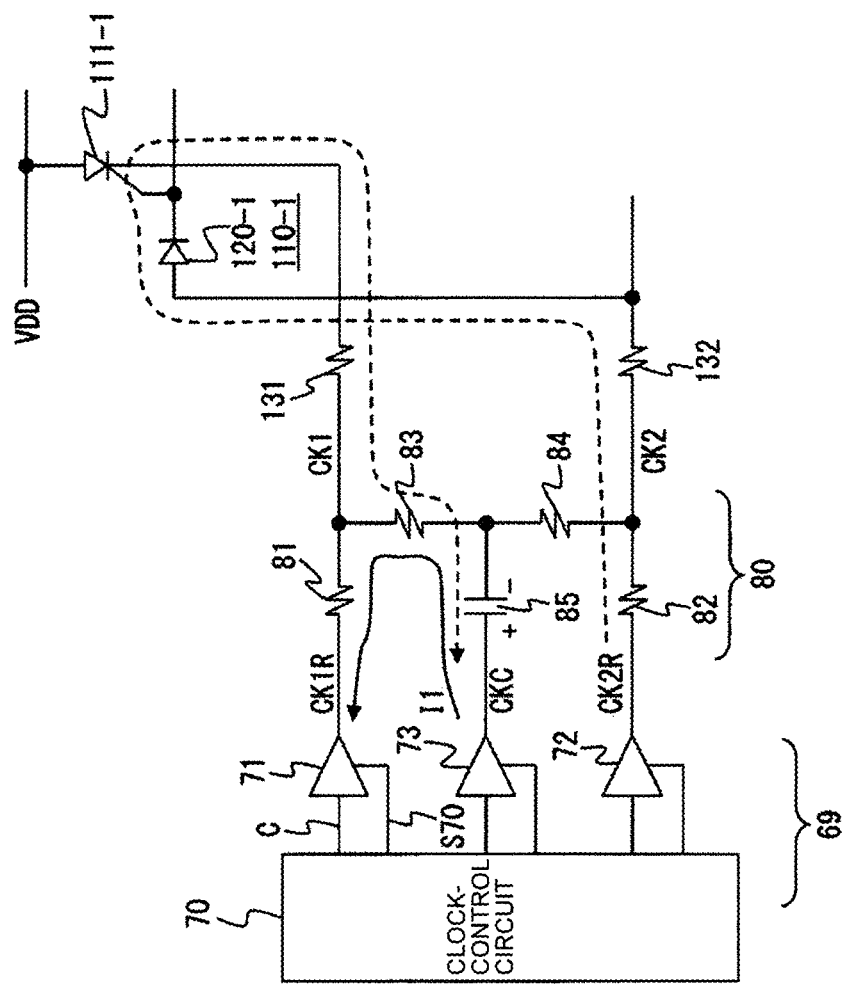
FIGS. 8A and 8B illustrate the configuration of clock-driver circuit 69, waveform-shaper circuit 80 and scan circuit 110-1 shown in FIG. 1, as well as a relevant portion of the timing chart shown in FIG. 7.
Figure 8B:
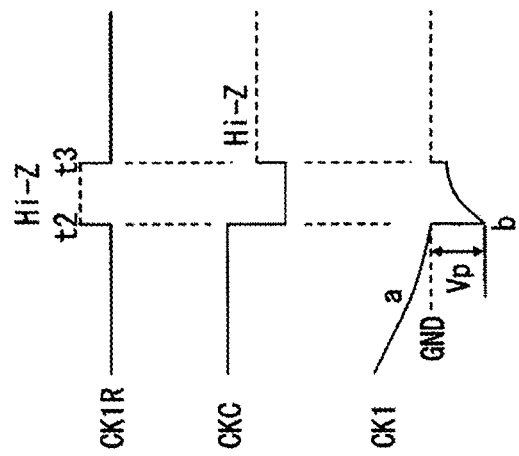

FIG. 8A is a diagram illustrating a relevant portion including clock-driver circuit 69, waveform-shaper circuit 80, and scan circuit 110-1 shown in FIG. 1. FIG. 8B is a diagram illustrating a relevant portion of the timing chart shown in FIG. 7. FIG. 8A is a circuit diagram of the relevant portion. FIG. 8B is a diagram illustrating the voltage waveforms in the relevant portion.

Let us discuss, for example, a case where clock pulse CK1R is at the H level. This case corresponds to the state shown in the left end portion of the timing chart in FIG. 7, which occurs before time t1. At that moment, clock CK1 is at the H level.

Once, at time t1 shown in FIG. 7, clock pulse CK1R becomes at the L level and clock pulse CKC becomes at the H level, current I1 is generated in a direction indicated with the solid-line arrow in FIG. 8A. Current I1 passes along a route starting from the CKC terminal and arriving at the CK1R terminal via capacitor 85, node N, resister 83, and resister 81. Current I1 serves as the charging current for capacitor 85, and generates a charging voltage between the two terminals of capacitor 85. The charging voltage is expressed as a positive polarity (+) in FIG. 8A.

Then, at time t2 shown in FIG. 8B, the CKC terminal becomes at the L level, and the CK1R terminal becomes in the Hi-Z state. Thereby, a charging voltage with a negative polarity (−) of capacitor 83 appears in the CK1 terminal, and the potential of the CK1 terminal turns negative. As a consequence, an undershoot waveform is generated, as shown in the b section in FIG. 8B.

At that moment, the CK2R terminal is at the H level while the CK2 terminal is also at the H level. Hence, current I2 is generated in a direction indicated with the dashed-line arrow in FIG. 8A. The route of current I2 is a route which reaches resister 131, resister 83, node N, and capacitor 85 after passing: through the CK2R terminal, resistor 82 and resister 132; through a path between the anode and the cathode of diode 120-1 in a forward direction; and through a path between the gate and the cathode of scan thyristor 111-1 in a forward direction. The current I2 generated at that moment becomes the gate-trigger current for scan thyristor 111-1, and turns on scan thyristor 111-1.

In the waveforms shown in FIG. 8B which represents the above-described processes, when clock pulse CKC is shifted to the L level and the CK1R terminal is shifted to the Hi-Z state, an undershoot portion appears in the b section in clock CK1. This makes it possible to make the potential of CK1 become lower than the GND potential by voltage Vp.

In a typical design example, source voltage VDD is 3.3 V, forward voltage Vf of diode 120-1 is approximately 1.6 V, and forward voltage Vgk of the PN junction that appears between the gate and the source of scan thyristor 111-1 is also 1.6 V. Hence, Vf+Vgk<VDD+Vp needs to be satisfied to generate current I2 that flows in the route indicated by the dashed-line arrow in FIG. 8A. If, in this case, the waveforms of clock Ck1 shown in FIG. 8B does not include the a section representing the undershoot and Vp=0, $Vf+Vgk=1.6+1.6=3.2$ V.

Hence, Vf+Vgk becomes approximately equal to source voltage VDD. Accordingly, the gate-trigger current large enough to turn ON scan thyristor 111-1 cannot be obtained.

With this taken into consideration, if, for example, as the undershoot waveform, Vp=0.6 V or the like is given, VDD+Vp=3.3+0.6=3.9 V. Accordingly, the gate-trigger current large enough to turn ON scan thyristor 111-1 can be generated.

Effects of First Embodiment

The first embodiment has the following effects (a) and (b).

(a) The driving of self-scan type thyristor head of the comparative example needs the clock-driver circuit to have the four output terminals in order to generate two clocks. In contrast, the first embodiment can reduce the number of output terminals in clock-driver circuit 69 to three, because scan-circuit portion 100 is driven by two clocks CK1, CK2 generated by making waveform-shaper circuit 80 re-shape the waveforms of clock pulses CK1R, CK2R, CKC outputted from clock-driver circuit 69. The first embodiment can reduce the number of necessary terminals to three quarters of the number of terminals needed in the comparative example. Hence, it is the matter of course that the data-transfer speed in print head 13 can be improved. In addition, because of the reduction in the number of output terminals in clock-driver circuit 69, the downscaling of the circuit can be expected, and a reduction in the cost can also be expected as a result of the downscaling of the circuit.

(b) Since image formation apparatus 1 of the first embodiment employs print head 13, image formation apparatus 1 can be offered as a high-quality apparatus with excellent space efficiency and light-extraction efficiency. The use of print head 13 enables the effects to be obtained not only for full-color image formation apparatus 1 of the first embodiment, but also for monochrome or multi-color image formation apparatuses. Larger effects can be obtained, particular, for full-color image formation apparatus 1 that needs numerous print heads 13 serving as exposure devices.

Second Embodiment

The circuit configurations of the print head and print controller of image formation apparatus 1 according to a second embodiment of the invention are different from the circuit configurations of print head 13 and print controller 40 of the first embodiment. Descriptions are given of what makes the second embodiment different from the first embodiment.
(Print Controller and Print Head of Second Embodiment)

FIG. 9 is a block diagram schematically illustrating the circuit configurations of the print controller and the print head according to the second embodiment of the invention. Elements that are the same as those in FIG. 1 showing the circuit configurations of the first embodiment are denoted by the same reference numerals as are used in FIG. 1.

Image formation apparatus 1 of the second embodiment includes, among other things, multiple print heads 13 (i.e., 13-1 to 13-$n$; e.g., n=13-1, 13-2, . . . , 13-6, . . . ), and print controller 40A configured to control print heads 13.

Print heads 13 (i.e., print heads 13-1 to 13-6, . . . ) of the second embodiment respectively include scan-circuit portions 100-1 to 101-6, . . . and main light emission portions 200-1 to 200-6, . . . that are similar to scan-circuit portions 100 and main light emission portions 200 of the first embodiment. Each of multiple print heads 13 (i.e., 13-1 to 13-6, . . . ) includes a scan chip made from a single chip, or a row of scan chips made from a group of chips. In this respect, each chip is monolithically produced using the semiconductor integrated circuit technique.

Print controller 40A includes multiple data-drive portions 60 (i.e., 60-1 to 60-6, . . . ), common clock-driver circuit 69A, and common waveform-shaper circuit 80A. Data-drive portions 60 (i.e., 60-1 to 60-6, . . . ) are configured to drive data DA to be provided respectively to main light emission portions 200 (i.e., 200-1 to 200-6, . . . ) in print heads 13 (i.e., 13-1 to 13-6, . . . ). Common clock-driver circuit 69A and common waveform-shaper circuit 80A are configured to generate multiple first clocks CK1-1, CK1-2, . . . , CK1-6, . . . and multiple second clocks CK2-1, CK2-2, . . . , CK2-6, . . . that are provided to the corresponding scan-circuit portions 100 (i.e., 100-1 to 100-6, . . . ) in print heads 13 (i.e., 13-1 to 13-6, . . . ).

Common clock-driver circuit 69A includes: clock-control circuit 70A configured to output multiple drive signals C and multiple control signals S70A; multiple three-state-type output buffers 71-1 to 71-6, . . . , 72-1 to 72-6, . . . , and 73 connected to the output side of clock-control circuit 70A; multiple first output terminals (e.g., a CK1R-1 terminal to a CK1R-6 terminal, . . . ) and multiple second output terminals (e.g., a CK2R-1 terminal to a CK2R-6 terminal, . . . ) respectively connected to the output terminals of these three-state-type output buffers 71-1 to 71-6, . . . , 72-1 to 72-6, . . . , and 73; and a single third output terminal (e.g., a CKC terminal).

Each of three-state-type output buffers 71-1 to 71-6, . . . , 72-1 to 72-6, . . . , and 73 is a circuit: which is configured to drive the corresponding one of drive signals C outputted from clock-control circuit 70A; in which when each of control signals S70A outputted from clock-control circuit 70A is at the H level, the logic level of the output terminal of each of three-state-type output buffers 71-1 to 71-6, . . . , 72-1 to 72-6, . . . , and 73 is equal to the logic level of the input terminal; and in which when each of control signals C is at the L level, the output terminal becomes in the Hi-Z state.

The multiple CK1R-1 terminal to the CK1R-6 terminal, . . . , the multiple CK2R-1 terminal to the CK2R-6 terminal, . . . , and the single CKC terminal-connected respectively to the output terminals of three-state-type output buffers 71-1 to 71-6, . . . , 72-1 to 72-6, . . . , and 73—are the terminals configured to output, to waveform-shaper circuit 80A, multiple first-clock pulses CK1R-1, CK1R-2, . . . , CK1R-6, . . . , multiple second-clock pulses CK2R-1, CK2R-2, . . . , CK2R-6, . . . , and single third-clock pulse CKC, respectively.

Waveform-shaper circuit 80A is a circuit configured to:
re-shape the waveforms of multiple first-clock pulses CK1R-1, CK1R-2, . . . , CK1R-6, . . . , multiple second-clock pulses CK2R-1, CK2R-2, . . . , CK2R-6, . . . , and single third-clock pulse CKC; output multiple first clocks CK1-1, CK1-2, . . . , CK1-6, . . . , and multiple second clock CK2-1, CK2-2, . . . , CK2-6, . . . through the CK1-1 terminal to the CK1-6 terminal, . . . , and through the CK2-1 terminal to the CK2-6 terminal, . . . , respectively; and provide the clocks respectively to multiple scan-circuit portions 100 (i.e., 100-1 to 101-6, . . . ) via connectors and connection cables, which are not illustrated.

Waveform-shaper circuit 80A includes multiple unit circuits that correspond respectively to scan-circuit portions 100 (i.e., 100-1 to 101-6, . . . ). Each unit circuit has a circuit configuration similar to that of waveform-shaper circuit 80 shown in FIG. 1.

For example, the unit circuit that provides first clock CK1-1 and second clock CK2-1 to scan-circuit portion 100-1 includes resister 81-1, resister 82-1, first resister 83-1, second resister 84-1, and capacitor 85-1. Resister 81-1 is connected between the CK1R-1 terminal and the CK1-1 terminal. Resister 82-1 is connected between the CK2R-1 terminal and the CK2-1 terminal. First resister 83-1 is connected between node N1 and a point which is between resister 81-1 and the CK1-1 terminal. Second resister 84-1 is connected between node N1 and a point which is between resister 82-1 and the CK2-1 terminal. Capacitor 85-1 is connected between the CKC terminal and node N1.

Likewise, the unit circuit that provides first clock CK1-2 and second clock CK2-2 to scan-circuit portion 100-2 includes resisters 81-2, 82-2, first and second resisters 83-2, 84-2, capacitor 85-2, and node N2. The unit circuit that provides both first clock CK1-6 and second clock CK2-6 to scan-circuit portion 100-6 includes resisters 81-6, 82-6, first and second resisters 83-6, 84-6, capacitor 85-6, and node N6.

Note that, as in the case of the first embodiment, resister 81-1, 81-2, . . . , 81-6, . . . , and resister 82-1, 82-2, . . . , 82-6, . . . in the respective unit circuits may be eliminated.
(Operations of Print Controller and Print Head of Second Embodiment)

Figure 10:
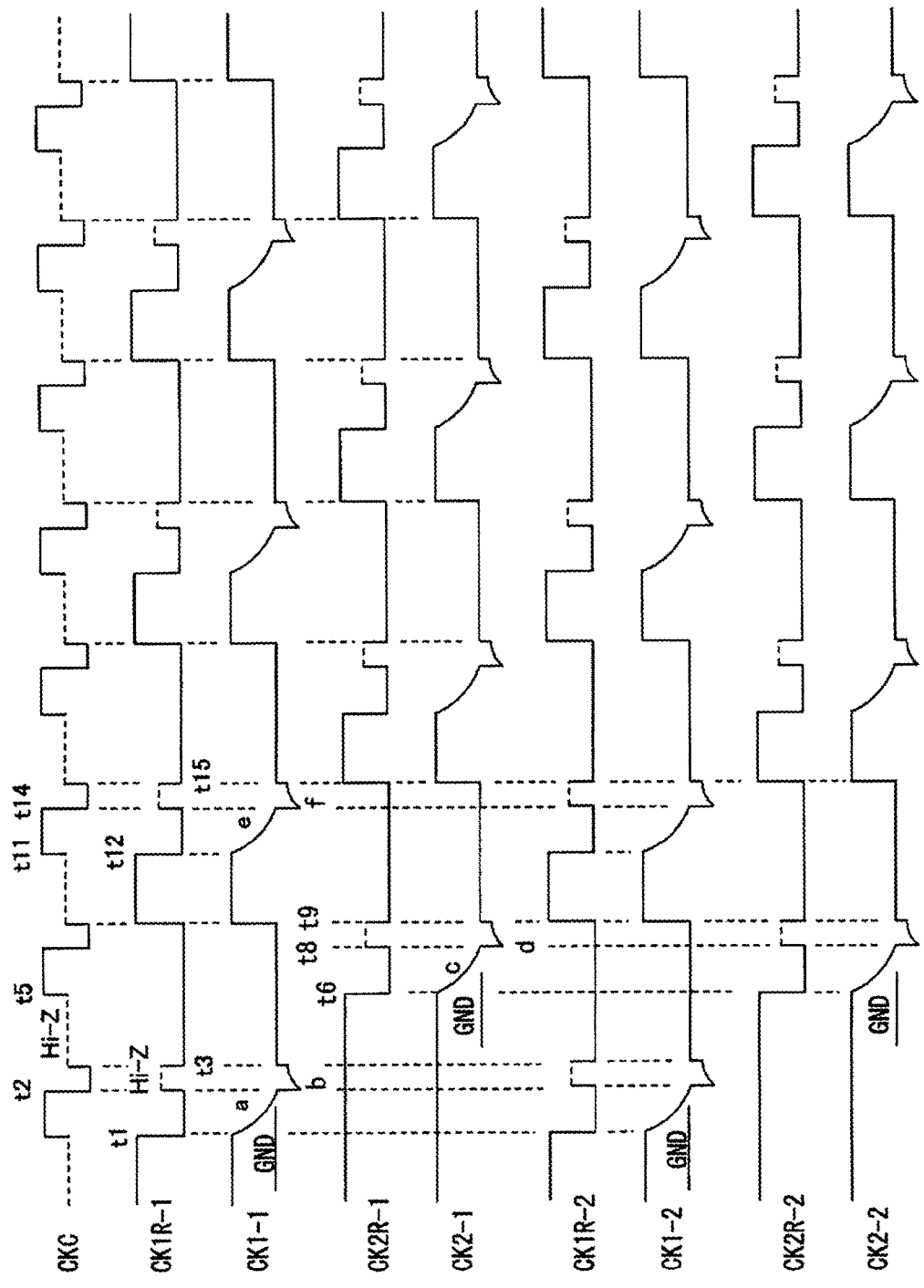
FIG. 10 is a timing chart illustrating the operations of the print controller and the print head shown in FIG. 9.

FIG. 10 is a timing chart illustrating operations of print heads 13-1, 13-2 and print controller 40A shown in FIG. 9. Elements that are the same as those shown in FIG. 7 representing the first embodiment are denoted by the same reference numerals as are used in FIG. 7.

For the sake of a simpler explanation, the timing chart of FIG. 10 includes clocks CK1-1, CK2-1 related to print head 13-1 and clocks CK1-2, CK2-2 related to print head 13-2, which are shown in FIG. 9. The timing chart of FIG. 10 omits clocks CK1-3 to CK1-6, . . . and CK2-3 to CK2-6, . . . related to other print heads 13-3 to 13-6, . . . .

Of clock pulses CK1R-1, CK2R-1 belonging to print head 13-1 and clock pulses CK1R-2, CK2R-2 belonging to print head 13-2, clock pulses CK1R-1, CK1R-2 are given the same waveform, whereas clock pulses CK2R-1, CK2R-2 are given the same waveform.

Since first terminals of capacitors 85-1 to 85-6, . . . are connected commonly to the CKC terminal of clock-driver circuit 69A, clocks CK1-1, CK1-2 have the same waveform, whereas clocks CK2-1, CK2-2 have the same waveform. Accordingly, the following paragraphs describe only clock pulse CK1R-1, clock CK1-1, clock pulse CK2R-1 and clocks CK2-1 belonging to print head 13-1.

While in the state before time t1 shown in the left end portion in the timing chart of FIG. 10, clock pulses CK1R-1, CK2R-2 are at the H level. For this reason, the H levels of clock pulses CK1R-1, CK2R-1 are transmitted respectively to the CK1-1 terminal via resister 81-1 and to the CK2-1 terminal via resister 82-2. Thus, the potentials of the CK1-1 terminal and the CK2-1 terminal become at the H level. Hence, of all of scan thyristors of scan-circuit portion 100-1 in print head 13-1, the cathodes of the set of odd-numbered scan thyristors 111-1, 111-3, . . . , 111-(n−1) and the cathodes in the set of even-numbered scan thyristors 111-2, 111-4, . . . , 111-n shown in FIG. 1 become at the H level, as well as the voltage between the anode and the cathode of each of these scan thyristors becomes almost zero, so that all of scan thyristors 111-1 to 111-n come to be in the OFF state.

In the following sections, description of the processes (1) to (3) of turning ON first scan thyristor 111-1, second scan thyristor 111-2, and third scan thyristor 111-3 are provided together with (4) a comparison between the second embodiment and a comparative example.

(1) Process of Turning ON Scan Thyristor 111-1

At time t1, clock pulse CK1R-1 drops to the L level while clock pulse CKC rises to the H level. Hence, a current is generated in the direction from the CKC terminal to capacitor 85-1, node N, resister 83-1, resister 81-1, and the CK1R-1 terminal. Accordingly, a charging current is generated in capacitor 85-1, and thus the voltage between the two terminals of capacitor 85-1 becomes higher. Consequently, the potential of the CK1-1 terminal drops to the GND potential, as shown in the a section.

At time t2, the CKC terminal drops to the L level, and the CK1R-1 terminal becomes in the Hi-Z state, as indicated by a horizontal dashed line representing an intermediate potential. Hence, an undershoot waveform occurs in clock CK1-1, as shown in the b section. The undershoot waveform is caused by the charging voltage of capacitor 85-1. After that, the charging electrical charges stored in capacitor 85-1 are self-discharged, and the voltage between the two terminals of capacitor 85-1 becomes smaller. Accordingly, the undershoot portion shown in the b section disappears as the time passes.

The occurrence of the undershoot portion in clock CK1-1 in the b section causes a relatively large voltage to be applied between the anode and the cathode of scan thyristor 111-1 in print head 13-1. At that moment, the CK2-1 terminal is at the H level, so that a trigger current is generated between the gate and the cathode of scan thyristor 111-1 via diode 120-1 and the trigger current turns ON scan thyristor 111-1. The ON state of scan thyristor 111-1 continues until the CK1-1 terminal on the cathode side of scan thyristor 111-1 becomes at the H level.

At time t3, the CKC terminal becomes in the Hi-Z state, and the CK1R-1 terminal drops to the L level. Hence, the potential of the CK1-1 terminal becomes substantially equal to the GND potential.

(2) Process of Turning ON Scan Thyristor 111-2

At time t5, the CKC terminal rises to the H level, and subsequently at time t6, the CK2R-1 terminal drops to the L level. Hence, a charging current is produced in a direction from the CKC terminal at the H level to capacitor 85-1, node N1, resisters 84-1, 82-2, and the CK2R-1 terminal. The charging current raises the voltage between the two terminals of capacitor 85-1. As a result, the potential of the CK2-1 terminal drops to the GND potential, as shown in the c section.

At time t8 following time t7, the CK2R-1 terminal becomes in the Hi-Z state, and subsequently, the CKC terminal drops to the L level. Hence, an undershoot waveform occurs in clock CK2-1, as indicated in the d section. The undershoot waveform is caused by the charging voltage of capacitor 85-1. After that, the charging electrical charges stored in capacitor 85-1 are self-discharged, and the voltage between the two terminals of capacitor 85-1 becomes smaller. Accordingly, the undershoot portion shown in the d section disappears as the time passes.

The occurrence of the undershoot portion in clock CK2-1 in the d section causes a relatively large voltage to be applied between the anode and the cathode of scan thyristor 111-2 in print head 13-1. At that moment, the CK1-1 terminal is at the L level, and the scan thyristor 111-1 is still in the ON state, as well as the gate potential is at the H level. Hence, a trigger current occurs between the gate and the cathode of scan thyristor 111-2 via diode 120-2 in print head 13-1, and the trigger current turns ON scan thyristor 111-2. The ON state continues until the CK2-1 terminal on the cathode side of scan thyristor 111-2 becomes at the H level.

At time t9, the CK2R-1 terminal becomes at the L level, and the CK2-1 terminal becomes at the L level. Subsequently, the CKC terminal becomes in the Hi-Z state. Simultaneously, at time t9, the CK1R-1 terminal rises to the H level, and the CK1-1 terminal also rises to the H level. As a result, scan thyristor 111-1 is turned OFF.

(3) Process of Turning ON Scan Thyristor 111-3

At time t11, the CKC terminal rises to the H level. Subsequently, at time t12, the CK1R-1 terminal drops to the L level. Hence, a charging current is produced in a direction from the CKC terminal at the H level to capacitor 85-1, node N1, resisters 83-1, 81-1, and the CK1R-1 terminal. The charging current raises the voltage between the two terminals of capacitor 85-1. As a result, the potential of the CK1-1 terminal drops to the GND potential, as shown in the e section.

At time t14 following times t12, t13, the CKC terminal drops to the L level. Subsequently, the CK1R-1 terminal becomes in the Hi-Z state. Hence, an undershoot waveform occurs in clock CK1-1, as indicated in the f section. The undershoot waveform is caused by the charging voltage of capacitor 85-1. After that, the charging electrical charges stored in capacitor 85-1 are self-discharged, and the voltage between the two terminals of capacitor 85-1 becomes smaller. Accordingly, the undershoot portion shown in the f section disappears as the time passes.

The occurrence of the undershoot portion in clock CK1-1 in the f section causes a relatively large voltage to be applied between the anode and the cathode of scan thyristor 111-3 in print head 13-1. At that moment, the CK1-1 terminal is at the L level, and the scan thyristor 111-2 is still in the ON state, as well as the gate potential is at the H level. Hence, a trigger current occurs between the gate and the cathode of scan thyristor 111-3 via diode 120-3 in print head 13-1, and the trigger current turns ON scan thyristor 111-3. The ON state of scan thyristor 111-3 continues until the CK1-1 terminal on the cathode side of scan thyristor 111-3 becomes at the H level.

At time t15, the CKC terminal becomes in the Hi-Z state, and the CK1R-1 terminal drops to the L level. Hence, the potential of the CK1-1 terminal becomes substantially equal to the GND potential. Simultaneously, the CK2R-1 terminal rises to the H level, and the CK2-1 terminal rises to the H level as well. Consequently, scan thyristor 111-3 is turned OFF.

(4) Comparison Between Second Embodiment and Comparative Example

As described earlier by referring to FIG. 10, two clocks CK1-1, CK2-1 have their respective forms whose phases are different from each other, but each of which represents a repeated series of the same waveform. The sequential input of clocks CK1-1, CK2-1, respectively, into the set of odd-numbered scan thyristors 111-1, 111-3, . . . , 111-(n−1) and the set of even-numbered scan thyristors 111-2, 111-4, . . . , 111-n makes scan thyristors 111-1 to 111-n turned ON consecutively.

The gate-trigger currents for scan thyristors 111-1 to 111-n are generated at the undershoot portions of clocks CK1-1 and CK2-1 (i.e., the b section, the d section, the f section, and the like). The undershoot waveforms at those moments are generated by use of capacitor 85-1. It may be considered that the undershoot waveforms of clock CK1 are generated by differentiating the waveform of clock pulse CKC by use of waveform-shaper circuit 80A including capacitor 85-1, node N1, and resisters 81, 82, 83, 84.

To drive a self-scan-type thyristor head of the comparative example needs two output terminals of the clock-driver circuit for each transfer clock. Specifically, four clock-drive output terminals are needed for each of print heads 13-1 to 13-6 to perform clock drive of scan thyristors in print heads 13-1 to 13-6. Hence, the clock-driver circuit of the comparative example needs a total of 24 (=4×6) drive output terminals.

As a result, since multiple self-scan type thyristor-array chips are arranged in the thyristor head, the total number of output terminals that the clock-driver circuit have to have becomes enormous. Hence, a reduction in the total number of output terminals of the clock-driver circuit to a number that allows all the output terminals to be accommodated in the LSI package increases the number of chips that are driven by being connected to the clock-driver circuit in parallel. As a result, waveforms distortion occurs. This causes a problem so that faster operations of the print head become unachievable.

In contrast, the configuration of the second embodiment shown in FIG. 9 makes 13 (=2×6+1) output terminal sufficient for clock-driver circuit 69A to have. This makes it possible to reduce the number of necessary terminals to almost half of the number of terminals included in the configuration of the comparative example.

Effects of Second Embodiment

The second embodiment has the following effects (a) and (b).

(a) The driving of self-scan type thyristor heads of the comparative example requires the clock-driver circuit to have two output terminals for each transfer clock. The transfer clocks include the two clocks. Multiple thyristor chips are grouped together to create, for example, 6 sets of print heads 13-1 to 13-6. Then, transfer clocks are generated on the group basis. Hence, the clock-driver circuit of the comparative example needs to have a total of 24 (=2×2×6) output terminals. In contrast, the use of the configuration of the second embodiment makes the 13 (=2×6+1) output terminals sufficient for clock-driver circuit 69A needs to have, and makes it possible to reduce the number of necessary output terminals to approximately half of the number of output terminals needed in the configuration of the comparative example. Accordingly, not only can the data-transfer speed in print heads 13-1 to 13-6 be improved, but also the downscaling of clock-driver circuit 69A and a reduction in cost can be expected because of the reduction in the number of output terminals.

(b) Image formation apparatus 1 of the second embodiment can obtain the same effect (b) as the first embodiment can, because of the use of print heads 13-1 to 13-6.

Modifications of First and Second Embodiments

The invention is not limited to the first and second embodiments, and can be carried out in other use modes and modifications. The following cases (I) and (II) are examples of such use modes and modifications.

(I) The cases where the invention is applied to light emission thyristors 210 used as light sources are described for the first and second embodiments. The invention is also applicable to cases where thyristors are used as switching elements and a voltage-application control is performed to apply voltage to other elements—e.g., organic electroluminescence elements (hereinafter simply referred to as "organic EL elements"), display elements, or the like—connected, for example in series, as the switching elements. For example, the invention can be used, among other things, in a printer equipped with an organic EL print head including an array of organic EL elements, and in a display apparatus including rows of display elements.

(II) The invention is also applicable to thyristors which are used as switching elements to drive (i.e., control the voltage application to) display elements (e.g., display elements arranged in rows or in a matrix). In addition, the invention is also applicable to 4-terminal thyristor SCSs (semiconductor controlled switches) where each thyristor has two gates—a first gate and a second gate, in addition to the thyristors which have the three-terminal structure.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A driver device to drive light emission elements arranged in a branch connection to a common terminal, comprising:
   a scan-circuit portion including scan circuits that are connected to one another in a cascade manner and include output terminals connected to the light emission elements on a one-to-one basis, wherein a first-clock terminal, from which to output a first clock signal, is connected to odd-numbered scan circuits, and a second-clock terminal, from which to output a second clock signal, is connected to even-numbered scan circuits, and wherein the scan circuit portion is configured to scan and drive the light emission elements sequentially from a first scan circuit to a last scan circuit once the second-clock signal is applied to the first scan circuit;
   a data-drive portion configured to drive the common terminal;

a clock-driver circuit including a first output terminal from which to output a first-clock pulse, a second output terminal from which to output a second-clock pulse that is different in phase from the first-clock pulse, and a third output terminal from which to output a third-clock pulse synchronized with both the first-clock pulse and the second-clock pulse; and a waveform-shaper circuit including a first resister having one end connected to a node and the other end connected to a point between the first output terminal and the first-clock terminal, a second resistor having one end connected to the node and the other end connected to a point between the second output terminal and the second-clock terminal, a capacitor having one end connected to the third output terminal and the other end connected to the node, the waveform-shaper circuit configured to re-shape a waveform of the first clock signal to be outputted to the first-clock terminal and a waveform of the second clock signal to be outputted to the second-clock terminal.

2. The driver device according to claim 1, wherein in the scan-circuit portion, each of the odd-numbered scan circuits includes a three-terminal switch element having a first terminal connected to a first power source, a second terminal connected to the first-clock terminal, and a control terminal connected to a corresponding one of the odd-numbered light emission elements and configured to control an ON/OFF state between the first terminal and the second terminal in the odd-numbered scan circuit, and each of the even-numbered scan circuits includes a three-terminal switch element having a first terminal connected to the first power source, a second terminal connected to the second-clock terminal, and a control terminal connected to a corresponding one of the even-numbered light emission elements and configured to control an ON/OFF state between the first terminal and the second terminal in the even-numbered scan circuit.

3. The driver device according to claim 2, wherein the control terminal of the three-terminal switch element in the first scan circuit is connected to the second-clock terminal via an opposite-direction diode, and the control terminal of the three-terminal switch element of each scan circuit is connected respectively to the control terminal of the three-terminal switch element of a sequentially next scan circuit via a forward-direction diode.

4. The driver device according to claim 3, wherein the control terminal of the three-terminal switch element in each scan circuit is connected, via a resister, to a second power source with a potential different from a potential of the first power source.

5. The driver device according to claim 4, wherein the first power source is configured to supply a source voltage, the second power source is at a ground potential, and the clock-driver circuit includes a first three-state-type output buffer configured to output the first-clock pulse through the first output terminal, a second three-state-type output buffer configured to output the second-clock pulse through the second output terminal, and a third three-state-type output buffer configured to output the third-clock pulse through the third output terminal.

6. The driver device according to claim 2, wherein the three-terminal switch element includes a thyristor.

7. The driver device according to claim 1, wherein the light emission elements include three-terminal light emission elements.

8. The driver device according to claim 7 wherein the three-terminal light emission elements are light emission thyristors.

9. A print head comprising:

the light emission elements according to claim 1; and the driver device according to claim 1.

10. An image formation apparatus comprising the print head according to claim 9 configured to emit light to form a latent image on an image carrier.

11. The driver device according to claim 1, wherein each of the first resistor, second resistor and capacitor are directly connected to the node.

12. A driver device to drive main light emission portions each including light emission elements arranged in a branching connection to a common terminal, comprising:

scan-circuit portions each including scan circuits that are connected to one another in a cascade manner and include output terminals connected to the light emission elements on a one-to-one basis, wherein a first-clock terminal, from which to output a first clock signal, is connected to odd-numbered scan circuits in each scan portion, and a second-clock terminal, from which to output a second clock signal, connected to even-numbered scan circuits in each scan portion, wherein each scan-circuit portion is configured to scan and drive the light emission elements sequentially from a first scan circuit to a last scan circuit once the second-clock signal is applied to the first scan circuit; and data-drive portions wherein each data-drive portion is configured to drive the common terminal of a corresponding scan-circuit portion;

a clock-driver circuit including first output terminals from which to output first-clock pulses, second output terminals from which to output second-clock pulses that are different in phase from the first-clock pulses, and a third output terminal from which to output a third-clock pulse synchronized with both the first-clock pulses and the second-clock pulses; and a waveform-shaper circuit including first resisters each having one end connected to a corresponding node and the other end connected to a point between the corresponding first output terminal and the corresponding first-clock terminal, second resisters each having one end connected to the corresponding node and a point between the corresponding second output terminal and the corresponding second-clock terminal, capacitors each having one end connected to the corresponding third output terminal and the other end connected to the corresponding node, wherein the waveform-shaper circuit is configured to re-shape waveforms of the first clock signals to be outputted to the first-clock terminals and waveforms of the second clock signals to be outputted to the second-clock terminals.

13. The driver device according to claim 12, wherein in the scan-circuit portion, each of the odd-numbered scan circuits includes a three-terminal switch element having a first terminal connected to a first power source, a second terminal connected to the first-clock terminal, and a control terminal connected to a corresponding one of the odd-numbered light emission elements and configured to control an ON/OFF state between the first terminal and the second terminal in the odd-numbered scan circuit, and each of the even-numbered scan circuits includes a three-terminal switch element having a first terminal connected to the first power source, a second terminal connected to the second-clock terminal, and a control terminal connected to a corresponding one of the even-numbered light emission elements and configured to control an ON/OFF state between the first terminal and the second terminal in the even-numbered scan circuit.

14. The driver device according to claim 13, wherein
the control terminal of the three-terminal switch element in the first scan circuit is connected to the second-clock terminal via an opposite-direction diode, and
the control terminal of the three-terminal switch element of each scan circuit is connected to the control terminal of the three-terminal switch element of a sequentially next scan circuit via a forward-direction diode.

15. The driver device according to claim 14, wherein the control terminal of the three-terminal switch element in each scan circuit is connected, via a resister, to a second power source with a potential different from a potential of the first power source.

16. The driver device according to claim 15 wherein
the first power source is configured to supply a source voltage,
the second power source is at a ground potential, and
the clock-driver circuit includes
a first three-state-type output buffer configured to output the first-clock pulse through the first output terminal,
a second three-state-type output buffer configured to output the second-clock pulse through the second output terminal, and
a third three-state-type output buffer configured to output the third-clock pulse through the third output terminal.

17. The driver device according to claim 13, wherein the three-terminal switch element includes a thyristor.

18. The driver device according to claim 12, wherein the light emission elements include three-terminal light emission elements.

19. The driver device according to claim 18 wherein the three-terminal light emission elements are light emission thyristors.

20. A print head comprising:
the main light emission portions according to claim 12; and
the driver device according to claim 11.

21. An image formation apparatus comprising the print head according to claim 20 configured to emit light to form a latent image on an image carrier.

22. The driver device according to claim 12, wherein each of the first resistor, second resistor and capacitor are directly connected to the node.

* * * * *